United States Patent
Babaei et al.

(10) Patent No.: US 10,750,532 B2
(45) Date of Patent: Aug. 18, 2020

(54) SEMI-PERSISTENT SCHEDULING TRANSMISSION SELECTION

(71) Applicants: Alireza Babaei, Fairfax, VA (US); Esmael Hejazi Dinan, Herndon, VA (US)

(72) Inventors: Alireza Babaei, Fairfax, VA (US); Esmael Hejazi Dinan, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 39 days.

(21) Appl. No.: 15/834,824

(22) Filed: Dec. 7, 2017

(65) Prior Publication Data
US 2018/0160445 A1    Jun. 7, 2018

Related U.S. Application Data

(60) Provisional application No. 62/431,130, filed on Dec. 7, 2016.

(51) Int. Cl.
*H04W 72/14* (2009.01)
*H04W 72/04* (2009.01)
*H04W 72/12* (2009.01)

(52) U.S. Cl.
CPC ......... *H04W 72/14* (2013.01); *H04W 72/042* (2013.01); *H04W 72/044* (2013.01); *H04W 72/1268* (2013.01)

(58) Field of Classification Search
CPC . H04W 72/044; H04W 72/14; H04W 72/042; H04W 72/1268
See application file for complete search history.

(56) References Cited

U.S. PATENT DOCUMENTS

| 2012/0069805 A1* | 3/2012 | Feuersanger | H04W 72/1236 370/329 |
| 2015/0245402 A1* | 8/2015 | Mochizuki | H04W 76/15 370/331 |
| 2017/0208612 A1* | 7/2017 | Tushar | H04W 88/08 |
| 2017/0295594 A1* | 10/2017 | Ozturk | H04W 52/04 |

(Continued)

OTHER PUBLICATIONS

3GPP TS 36.211 V14.0.0; Sep. 2016; Release 14; Sidelink.

(Continued)

*Primary Examiner* — Asad M Nawaz
*Assistant Examiner* — Syed Ali
(74) *Attorney, Agent, or Firm* — David Grossman; Kavon Nasabzadeh; Philip Smith

(57) ABSTRACT

A wireless device receives a message. The message comprises first configuration parameters of a first SPS, and second configuration parameters of a second SPS. The wireless device receives a first DCI indicating activation of the first SPS. The first SPS allocates resources in TTIs comprising a first TTI. The wireless device receives a second DCI indicating activation of the second SPS and transmits second TB(s) based on the second DCI and the second configuration parameters. The wireless device receives a negative acknowledgement for a scheduled retransmission of the second TB(s) in the first TTI. The wireless device selects TB(s) for transmission in the first TTI, one of: a scheduled transmission of first TB(s) corresponding to the first SPS, or the scheduled retransmission of the second TB(s). The selected TB(s) are transmitted in the first TTI.

16 Claims, 22 Drawing Sheets

(56) References Cited

U.S. PATENT DOCUMENTS

| | | | |
|---|---|---|---|
| 2018/0049229 A1* | 2/2018 | Dinan | H04W 72/1268 |
| 2018/0242326 A1* | 8/2018 | Aiba | H04W 28/06 |
| 2018/0255569 A1* | 9/2018 | Aiba | H04W 56/00 |
| 2019/0021085 A1* | 1/2019 | Mochizuki | H04W 76/27 |
| 2019/0045507 A1* | 2/2019 | Sorrentino | H04W 76/14 |
| 2019/0159241 A1* | 5/2019 | Aiba | H04J 11/00 |

OTHER PUBLICATIONS

3GPP TS 36.212 V14.0.0 (Sep. 2016); Technical Specification; 3rd Generation Partnership Project; Technical Specification Group Radio Access Network;; Evolved Universal Terrestrial Radio Access (E-UTRA); Multiplexing and channel coding (Release 14).

3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).

3GPP TS 36.300 V14.0.0 (Sep. 2016); Technical Specification; 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description;Stage 2 (Release 14).

3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access Control (MAC) protocol specification (Release 14).

3GPP TS 36.331 V14.0.0 (Sep. 2016); Technical Specification; 3rd Generation Partnership Project;; Technical Specification Group Radio Access Network; Evolved Universal Terrestrial Radio Access (E-UTRA); Radio Resource Control (RRC); Protocol specification (Release 14).

R1-1609290; 3GPP TSG RAN WG1 Meeting #86bis; Lisbon, Portugal Oct. 10-14, 2016; Source: CMCC; Title: Discussion on SL-SPS DCI and cross carrier scheduling.

R1-1608596; 3GPP TSG RAN WG1 Meeting #86bis; Lisbon, Portugal, Oct. 10-14, 2016; Agenda Item: 7.2.1.1.1; Source: Huawei, HiSilicon; Title: SPS enhancement for V2X on Uu interface.

R1-1608650; 3GPP TSG RAN WG1 Meeting #86bis; Lisbon, Portugal, Oct. 10-14, 2016; Agenda Item: 7.2.1.1.1; Source: Huawei, HiSilicon; Title: DCI design for sidelink SPS scheduling.

R1-1608987; 3GPP TSG RAN WG1 Meeting #86bis; Lisbon, Portugal Oct. 10-14, 2016; Agenda Item: 7.2.1.1.1; Source:Samsung; Title: Support of multiple UL SPS configurations.

R1-1608988; 3GPP TSG RAN WG1 Meeting #86bis; Lisbon, Portugal Oct. 10-14, 2016; Agenda Item: 7.2.1.1.1; Source:Samsung; Title: Remaining details on DCI design for Mode 3.

R1-1609181; 3GPP TSG RAN WG1 Meeting #86bis; Lisbon, Portugal, Oct. 10-14, 2016; Agenda item: 7.2.1.1.1; Source: LG Electronics; Title: Remaining details of UE procedure for sidelink and uplink SPS.

R1-1609401; 3GPP TSG RAN WG1 Meeting #86bis; Lisbon, Portugal Oct. 10-14, 2016; Agenda Item: 7.2.1.1.1; Source:Lenovo; Title: Discussion on DCI design to support multiple SPS configurations.

R1-1609570; 3GPP TSG RAN WG1 Meeting #86bis; Lisbon, Portugal Oct. 10-14, 2016; Source: Panasonic; Title: Signalling design on supporting SPS for slidelink transmission mode 3.

R1-1609732; 3GPP TSG RAN WG1 Meeting #86bis; Lisbon, Portugal, Oct. 10-14, 2016; Source: Ericsson; Title: SL-SPS and DCI design for V2X.

R1-1609752; 3GPP TSG RAN WG1 Meeting #86bis; Lisbon, Portugal, Oct. 10-14, 2016; Source: Ericsson; Title: UL-SPS and DCI design for V2X.

R1-1609804; 3GPP TSG RAN WG1 Meeting #86bis; Lisbon, Portugal Oct. 10-14, 2016; Source: ZTE; Title: Scheduling of V2X SPS resources.

R1-1609888; 3GPP TSG RAN WG1 Meeting #86bis; Lisbon, Portugal Oct. 10-14, 2016; Agenda item: 7.2.1.1.1; Source: Potevio; Title: Details of multiple SPS configurations for V2X over UU.

R1-1609956; 3GPP TSG-RAN WG1 #86Bis; Oct. 10-14, 2016; Lisbon, Portugal; Agenda item: 7.2.1.1.1; Source: Qualcomm Incorporated; Title: SPS enhancments for V2X.

R1-1610037; 3GPP TSG RAN WG1 Meeting #86bis; Lisbon, Portugal Oct. 10-14, 2016; Source: NTT DOCOMO; Title: Multiple SPS support for sidelink and uplink V2X.

R1-1610556; 3GPP TSG RAN WG1 Meeting #86bis; Lisbon, Portugal Oct. 10-14, 2016; Source: CATT; Title: DCI design to support multiple SPS configurations.

R1-1610812; 3GPP TSG RAN WG1 Meeting #86bis; Lisbon, Portugal Oct. 10-14, 2016; Title: WF on DCI design for V2X UL SPS.

R1-1611135; 3GPP TSG RAN WG1 Meeting #87; Reno, USA, Nov. 14-18, 2016; Agenda Item: 6.2.1.1.2; Source: Huawei, HiSilicon; Title: Remaining issues for SPS procedures.

R1-1611191; 3GPP TSG RAN WG1 Meeting #87; Reno, USA Nov. 14-18, 2016; Agenda Item: 6.2.1.1.1; Source: Huawei, HiSilicon; Title: Remaining issues for SPS DCI design.

R1-1611332; 3GPP TSG RAN WG1 Meeting #87; Reno, USA Dec. 14-18, 2016; Source: CATT; Title: Remaining details of DCI design.

R1-1611591; 3GPP TSG-RAN WG1 #86Bis; Nov. 14-18, 2016; Reno, USA; Agenda item: 6.2.1.1.1; Source: Qualcomm Incorporated; Title: SPS enhancments for V2X.

R1-1611735; 3GPP TSG RAN WG1 Meeting #87; Reno, US, Nov. 14-18, 2016; Agenda item: 6.2.1.1.1; Source: LG Electronics; Title: Remaining details of DCI design for SL and UL SPS.

R1-1611736; 3GPP TSG RAN WG1 Meeting #87; Reno, US, Nov. 14-18, 2016; Agenda item: 6.2.1.1.2; Source: LG Electronics; Title: Remaining details of UE behavior for SL and UL SPS.

R1-1611871; 3GPP TSG RAN WG1 Meeting #87; Reno, USA, Nov. 14-18, 2016; Agenda Item: 6.2.1.5; Source: Huawei, HiSilicon. Title: Remaining details of cross-carrier scheduling.

R1-1612100; 3GPP TSG RAN WG1 Meeting #87; Reno, USA Nov. 14-18, 2016; Source: ZTE; Title: DCI format of V2X SPS resources.

R1-1612112; 3GPP TSG RAN WG1 Meeting #87; Reno, USA Nov. 14-18, 2016; Source: Panasonic; Title: Discussion on size alignment between SL SPS DCI and DCI format 0.

R1-1612171; 3GPP TSG RAN WG1 Meeting #87; Reno, USA Nov. 14-18, 2016; Source: CMCC; Title: Remaining details of DCI design.

R1-1612389; 3GPP TSG RAN WG1 Meeting #87; Reno, USA Nov. 14-18, 2016; Agenda Item: 6.2.1.1.1; Source: Samsung; Title: Support of multiple SL/UL SPS configurations.

R1-1612393; 3GPP TSG RAN WG1 Meeting #87; Reno, USA Nov. 14-18, 2016; Agenda item: 6.2.1.5; Source: Samsung; Title: Power allocation for simultaneous UL and SL TX in different carriers.

R1-1612686; 3GPP TSG RAN WG1 Meeting #87; Reno, USA Nov. 14-18, 2016; Source: NTT DOCOMO; Title: On support of implicit SPS release for sidelink.

R1-1612879; 3GPP TSG-RAN WG1 Meeting #87; Reno, USA Nov. 14-18, 2016; Source: Nokia, Alcatel-Lucent Shanghai Bell; Title: On Signalling for SPS.

R1-1612939; 3GPP TSG RAN WG1 Meeting #87; Reno, Nevada, USA, Nov. 14-18, 2016; Source: Ericsson; Title: DCI design for SL SPS.

R1-1613185; 3GPP TSG RAN WG1 Meeting #87; Reno, US Nov. 14-18, 2016; WF on power control for simultaneous UL TX and SL TX in different carriers.

\* cited by examiner

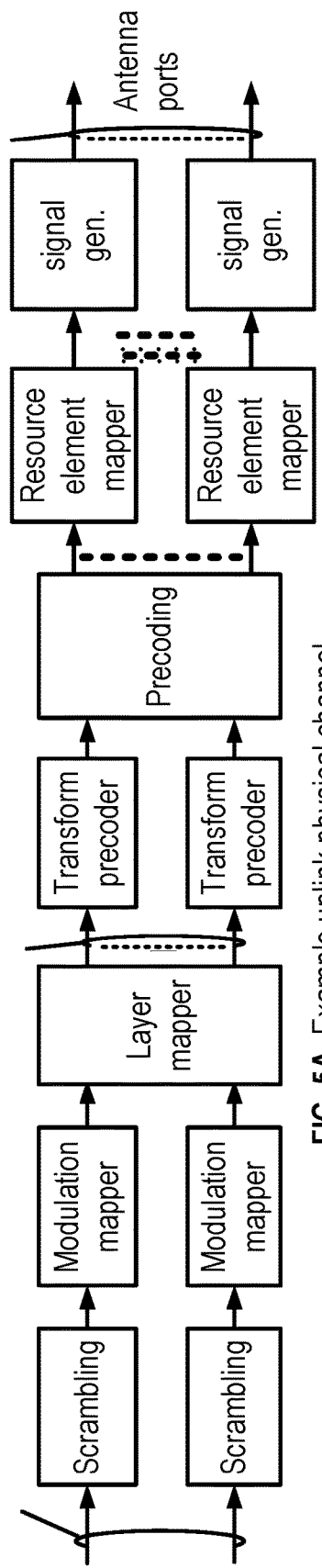
FIG. 5A Example uplink physical channel
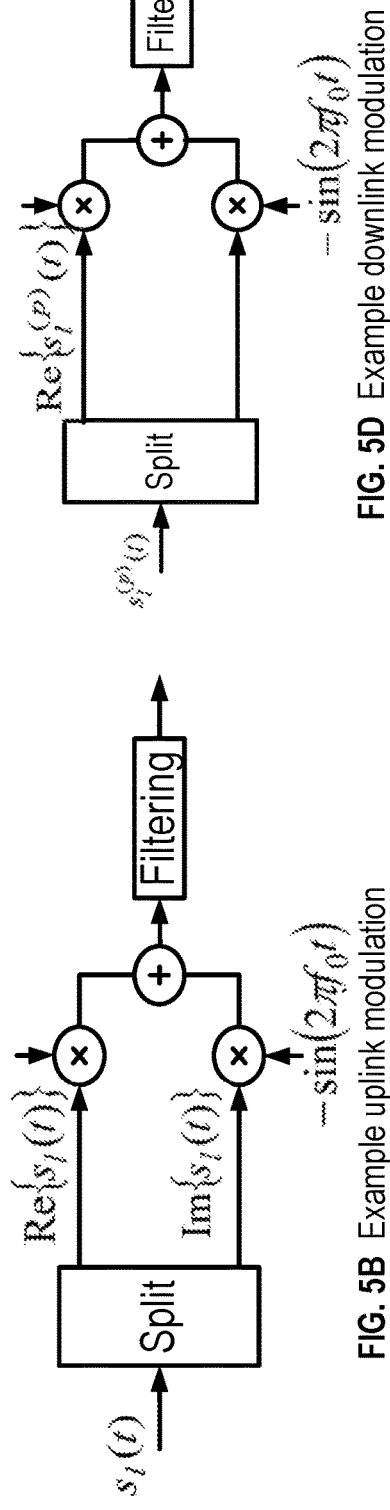
FIG. 5B Example uplink modulation
FIG. 5D Example downlink modulation
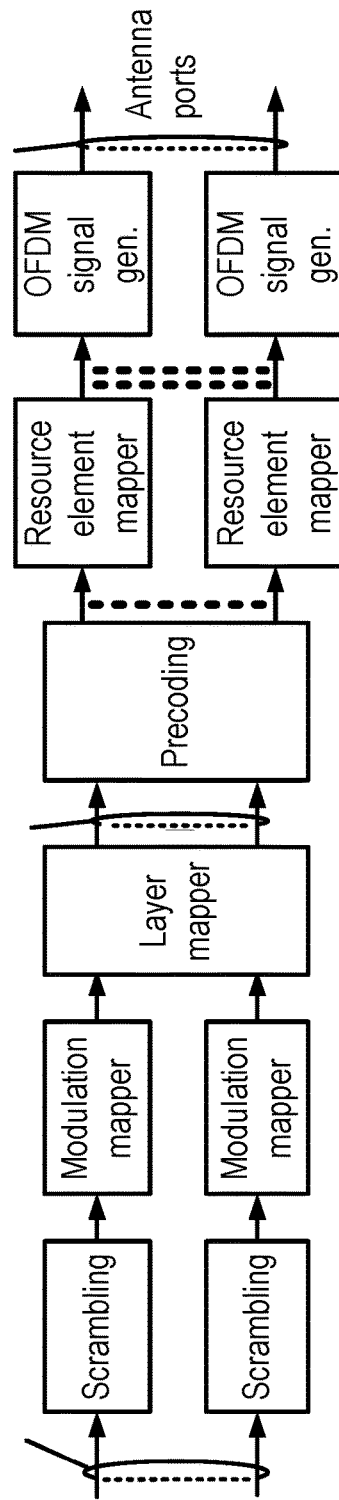
FIG. 5C Example downlink physical channel

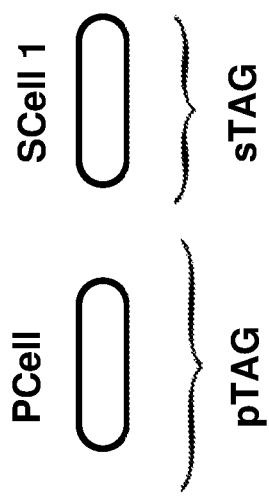
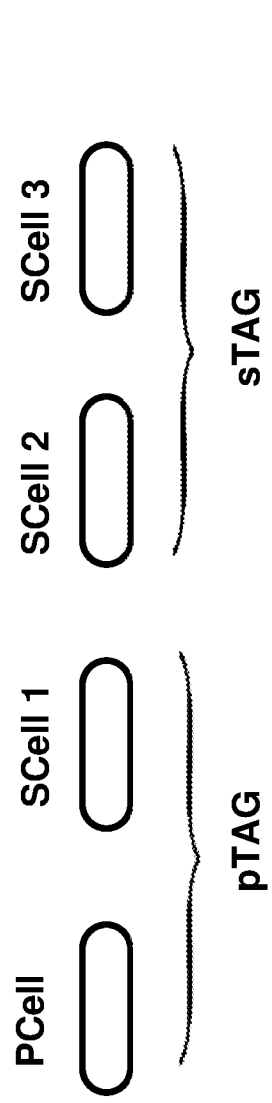
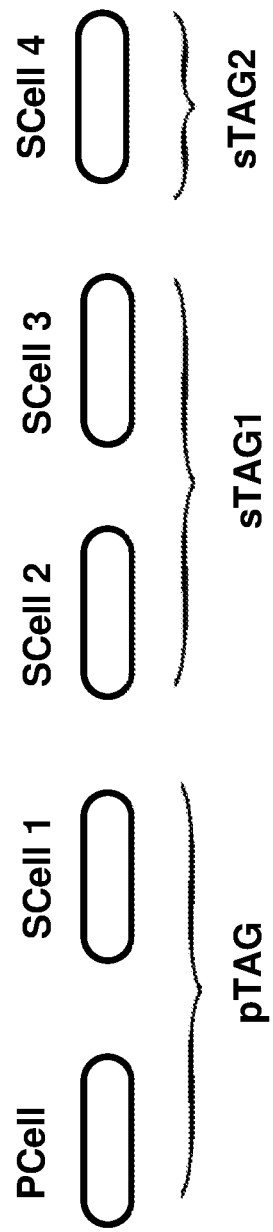
FIG. 8

| | Oct 1 |
|---|---|
| $C_7$ $C_6$ $C_5$ $C_4$ $C_3$ $C_2$ $C_1$ R | |

Example Activation/Deactivation MAC control element of one octet

| Oct 1 | Oct 2 | Oct 3 | Oct 4 |
|---|---|---|---|
| R | $C_8$ | $C_{16}$ | $C_{24}$ |
| $C_1$ | $C_9$ | $C_{17}$ | $C_{25}$ |
| $C_2$ | $C_{10}$ | $C_{18}$ | $C_{26}$ |
| $C_3$ | $C_{11}$ | $C_{19}$ | $C_{27}$ |
| $C_4$ | $C_{12}$ | $C_{20}$ | $C_{28}$ |
| $C_5$ | $C_{13}$ | $C_{21}$ | $C_{29}$ |
| $C_6$ | $C_{14}$ | $C_{22}$ | $C_{30}$ |
| $C_7$ | $C_{15}$ | $C_{23}$ | $C_{31}$ |

Example Activation/Deactivation MAC control element of four octets

FIG. 10

| TDD UL/DL configuration | Position of initial Semi-Persistent grant | Subframe_Offset value (ms) |
|---|---|---|
| 0 | N/A | 0 |
| 1 | Subframes 2 and 7 | 1 |
| 1 | Subframes 3 and 8 | -1 |
| 2 | Subframe 2 | 5 |
| 2 | Subframe 7 | -5 |
| 3 | Subframes 2 and 3 | 1 |
| 3 | Subframe 4 | -2 |
| 4 | Subframe 2 | 1 |
| 4 | Subframe 3 | -1 |
| 5 | N/A | 0 |
| 6 | N/A | 0 |

FIG. 11

SEMI-PERSISTENT SCHEDULING TRANSMISSION SELECTION

CROSS-REFERENCE TO RELATED APPLICATIONS

This application claims the benefit of U.S. Provisional Application No. 62/431,130, filed Dec. 7, 2016 which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 10 is an example diagram depicting Activation/Deactivation MAC control elements as per an aspect of an embodiment of the present disclosure.

FIG. 11 is an example diagram depicting example subframe offset values as per an aspect of an embodiment of the present disclosure.

DETAILED DESCRIPTION OF EMBODIMENTS

Figure 1:
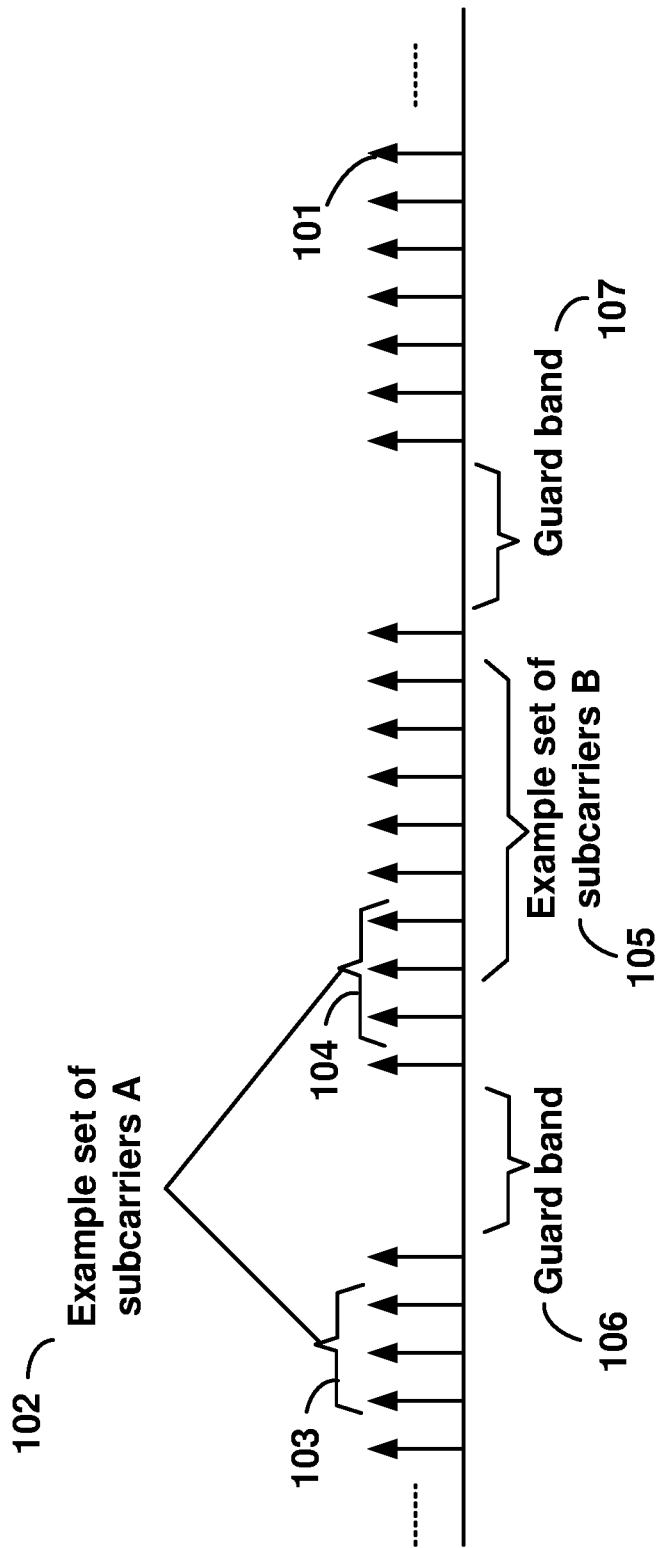
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
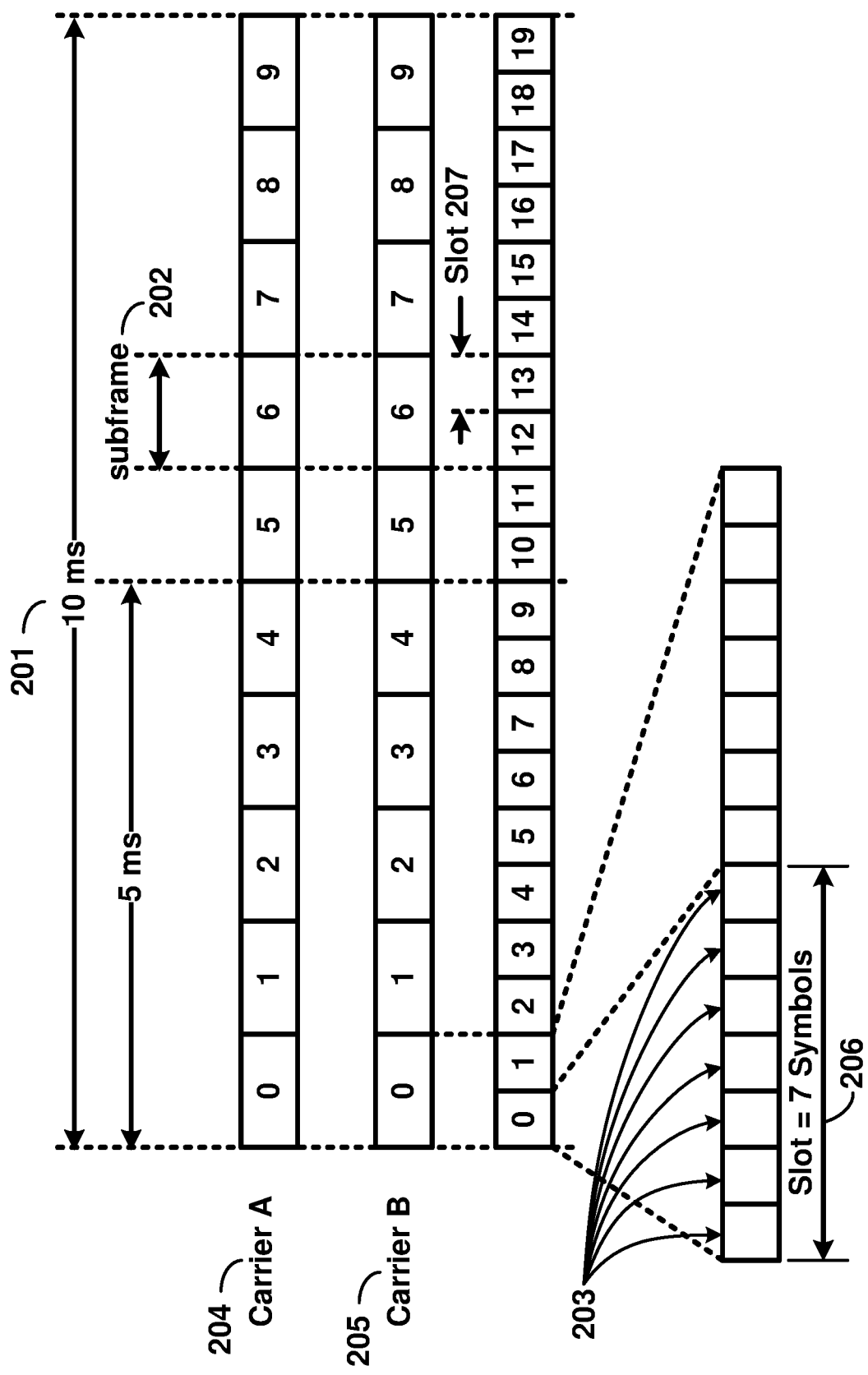
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
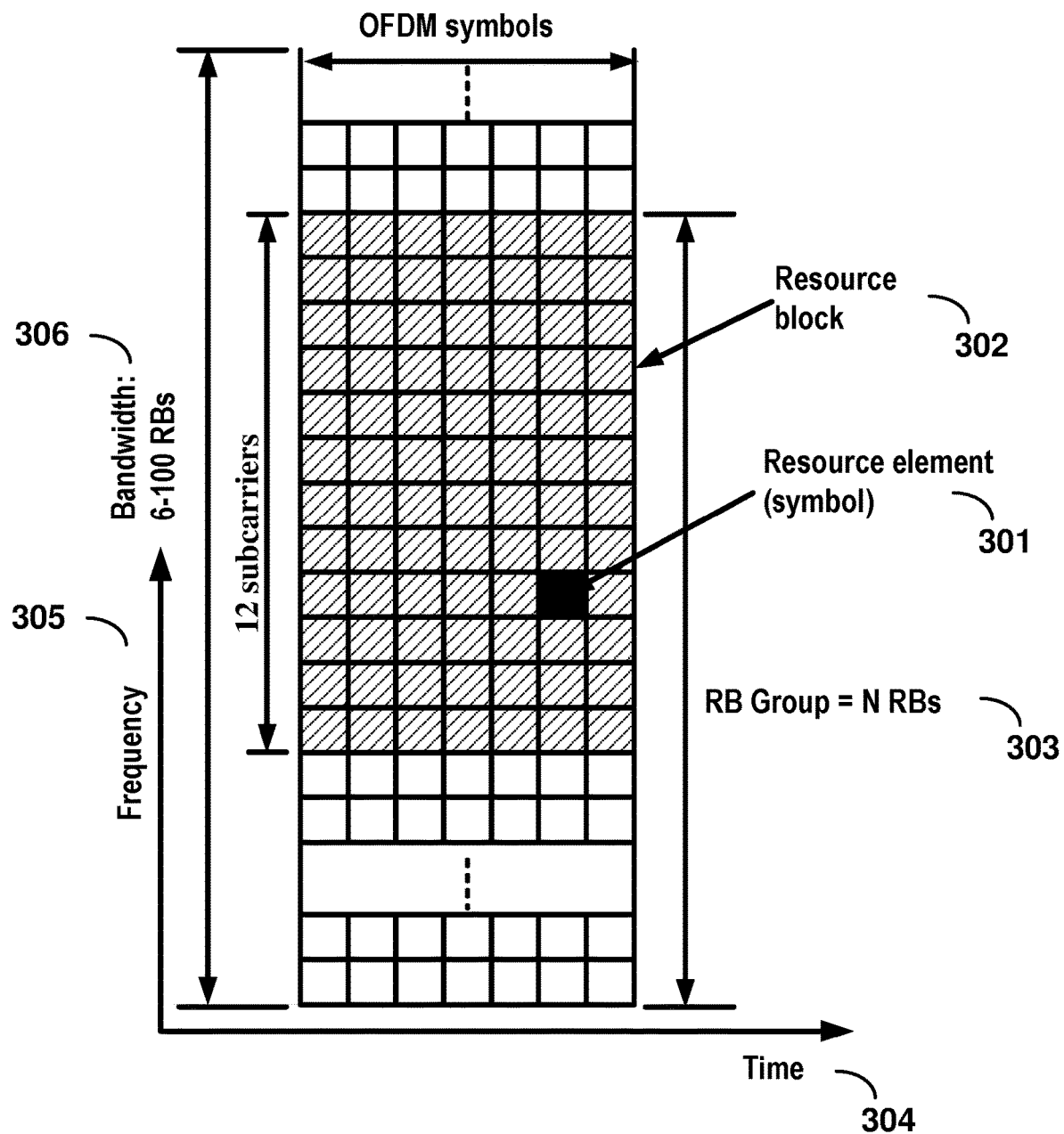
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
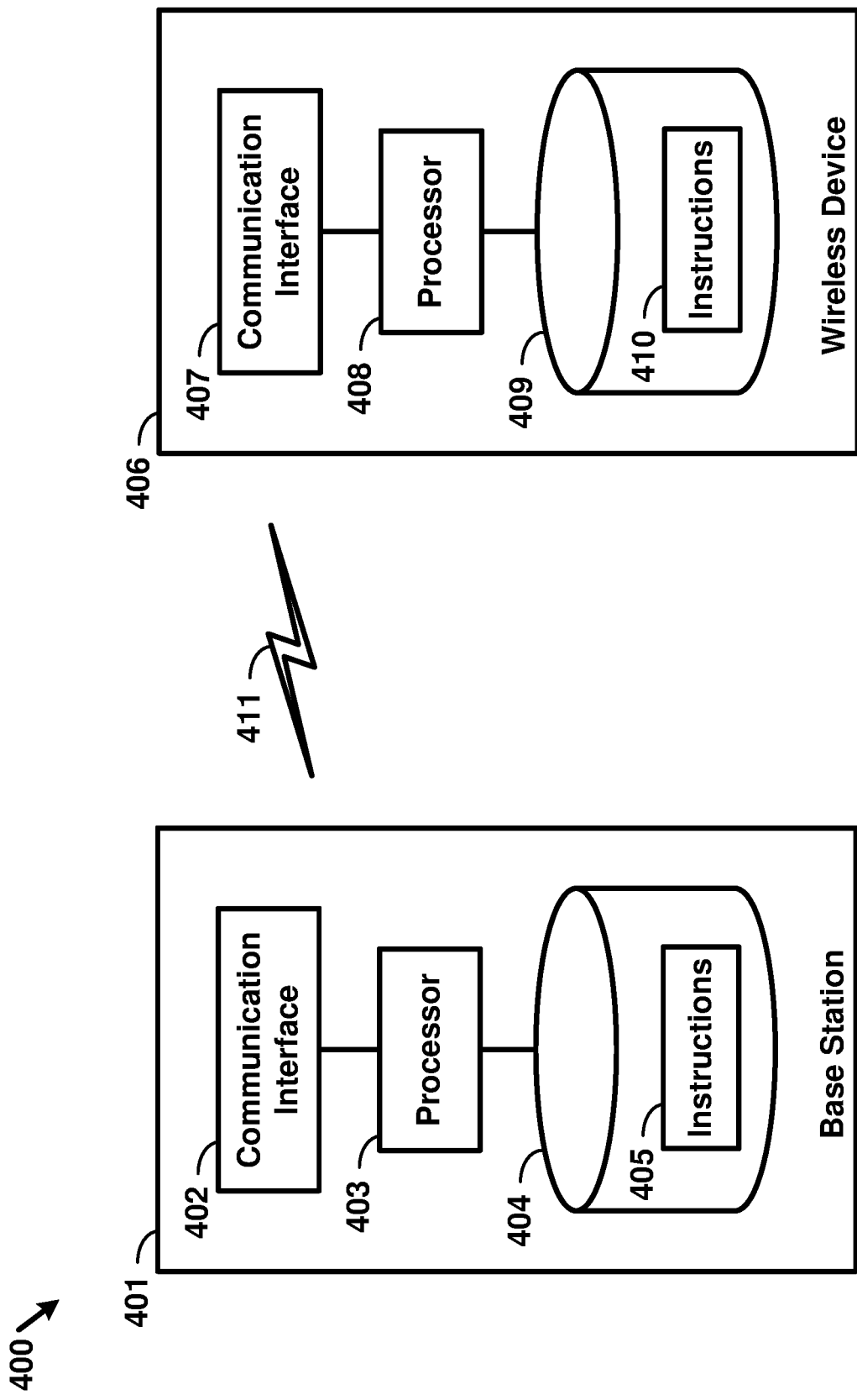
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
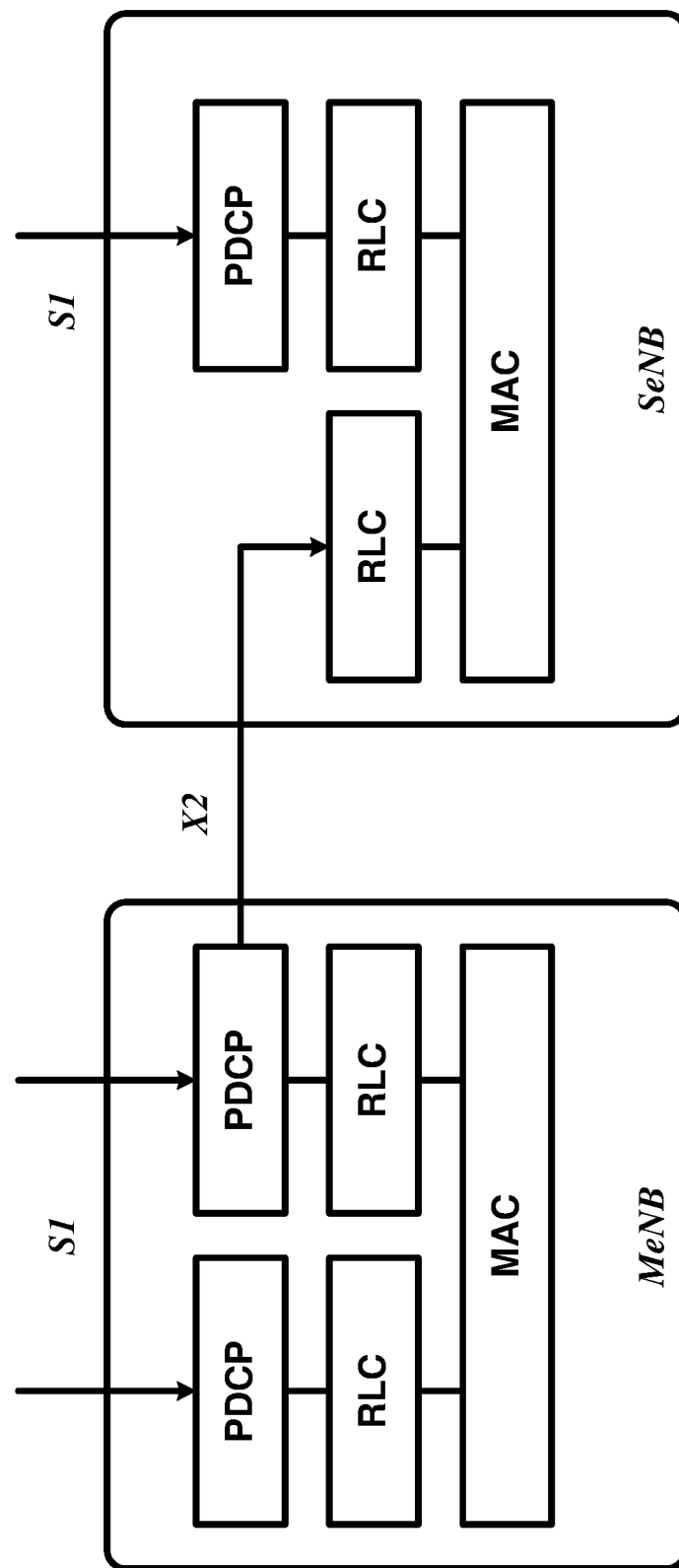
FIG. 6 is an example diagram for a protocol structure with CA and DC as per an aspect of an embodiment of the present disclosure.
Figure 7:
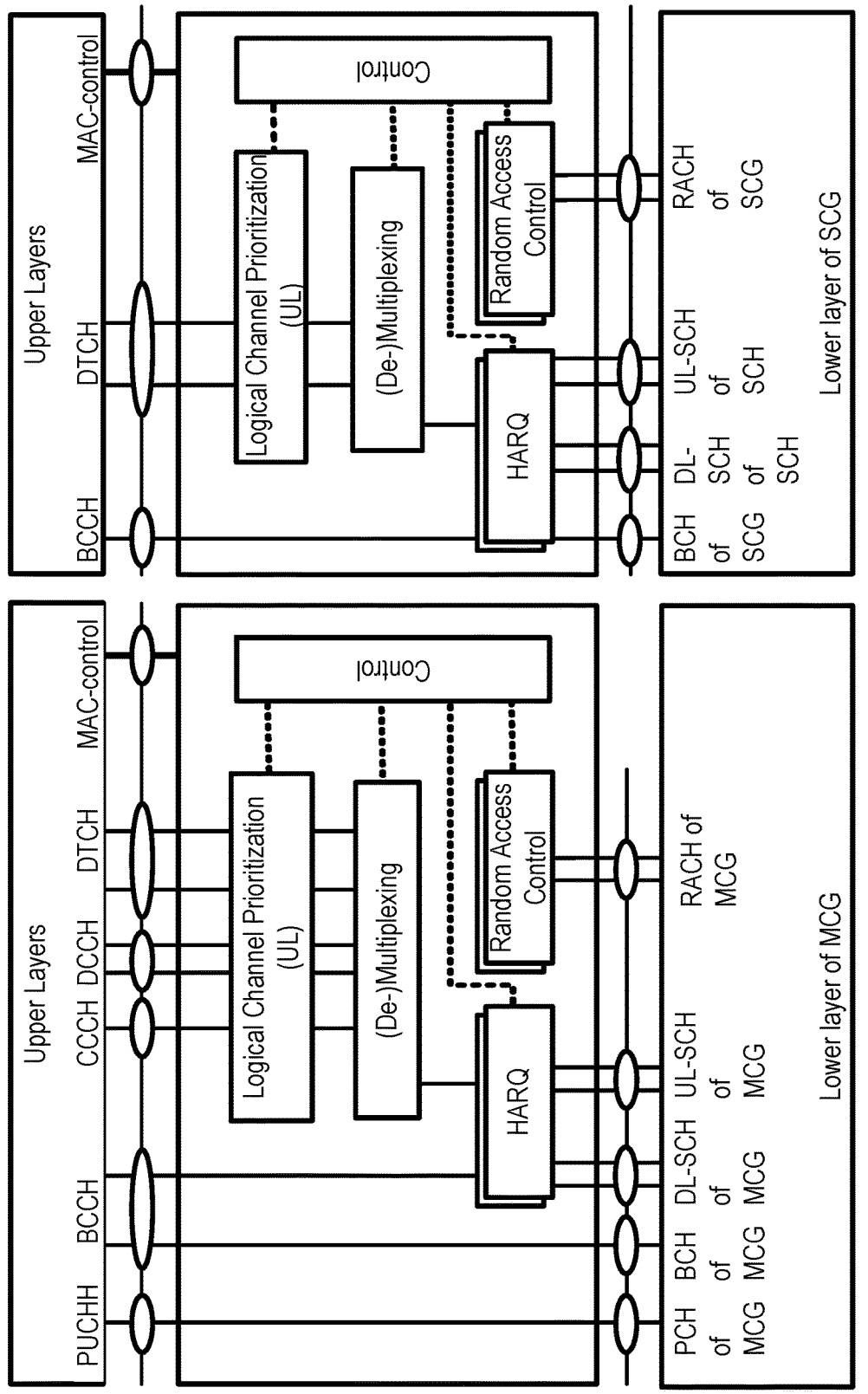
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and a sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and a sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
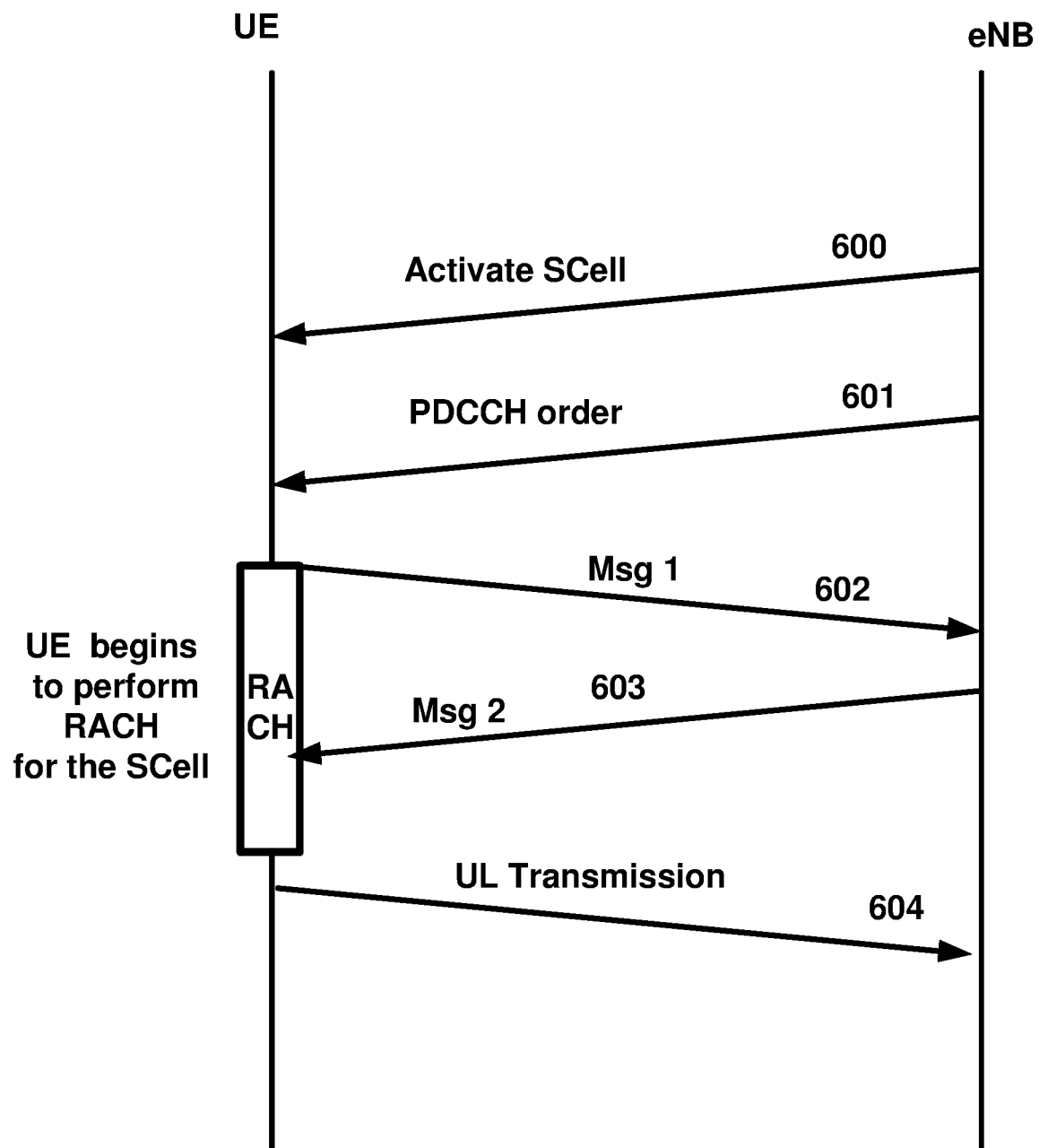
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to a sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from a sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and the number of aggregated carriers increase, the number of PUCCHs and the PUCCH payload size may also increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

In an example, the MAC entity may be configured with one or more SCells. In an example, the network may activate and/or deactivate the configured SCells. The SpCell may always be activated. The network may activate and deactivates the SCell(s) by sending the Activation/Deactivation MAC control element. The MAC entity may maintain a sCellDeactivationTimer timer for a configured SCell. Upon the expiry of sCellDeactivationTimer timer, the MAC entity may deactivate the associated SCell. In an example, the same initial timer value may apply to each instance of the sCellDeactivationTimer and it may be configured by RRC. The configured SCells may initially be deactivated upon addition and after a handover. The configured SCG SCells may initially be deactivated after a SCG change.

In an example, if the MAC entity receives an Activation/Deactivation MAC control element in a TTI activating a SCell, the MAC entity may, in a TTI according to the timing defined below, activate the SCell and apply normal SCell operation including SRS transmissions on the SCell, CQI/PMI/RI/PTI/CRI reporting for the SCell, PDCCH monitoring on the SCell, PDCCH monitoring for the SCell and PUCCH transmissions on the SCell, if configured. The MAC entity may start or restart the sCellDeactivationTimer associated with the SCell and trigger power headroom report (PHR). In an example, if the MAC entity receives an Activation/Deactivation MAC control element in a TTI deactivating a SCell or if the sCellDeactivationTimer associated with an activated SCell expires in the TTI, the MAC entity may, in a TTI according to the timing defined below, deactivate the SCell, stop the sCellDeactivationTimer associated with the SCell and flush all HARQ buffers associated with the SCell.

In an example, when a UE receives an activation command for a secondary cell in subframe n, the corresponding actions above may be applied no later than the minimum requirements and no earlier than subframe n+8, except for the actions related to CSI reporting on a serving cell which may be active in subframe n+8 and the actions related to the sCellDeactivationTimer associated with the secondary cell which may be applied in subframe n+8. The actions related to CSI reporting on a serving cell which is not active in subframe n+8 may be applied in the earliest subframe after n+8 in which the serving cell is active.

In an example, when a UE receives a deactivation command for a secondary cell or the sCellDeactivationTimer associated with the secondary cell expires in subframe n, the corresponding actions above may apply no later than the minimum requirement except for the actions related to CSI reporting on a serving cell which is active which may be applied in subframe n+8.

In an example, if the PDCCH on the activated SCell indicates an uplink grant or downlink assignment or if the PDCCH on the Serving Cell scheduling an activated SCell indicates an uplink grant or a downlink assignment for the activated SCell, the MAC entity may restart the sCellDeactivationTimer associated with the SCell.

In an example, if a SCell is deactivated, the UE may not transmit SRS on the SCell, may not report CQI/PMI/RI/PTI/CRI for the SCell, may not transmit on UL-SCH on the SCell, may not transmit on RACH on the SCell, may not monitor the PDCCH on the SCell, may not monitor the PDCCH for the SCell and may not transmit PUCCH on the SCell.

In an example, the HARQ feedback for the MAC PDU containing Activation/Deactivation MAC control element may not be impacted by PCell interruption due to SCell activation/deactivation. In an example, when SCell is deactivated, the ongoing Random Access procedure on the SCell, if any, may be aborted.

In an example, the Activation/Deactivation MAC control element of one octet may be identified by a MAC PDU subheader with LCID 11000. FIG. 10 shows example Activation/Deactivation MAC control elements. The Activation/Deactivation MAC control element may have a fixed size and may consist of a single octet containing seven C-fields and one R-field. Example Activation/Deactivation MAC control element with one octet is shown in FIG. 10. The Activation/Deactivation MAC control element may have a fixed size and may consist of four octets containing 31 C-fields and one R-field. Example Activation/Deactivation MAC control element of four octets is shown in FIG. 10. In an example, for the case with no serving cell with a serving cell index (ServCellIndex) larger than 7, Activation/Deactivation MAC control element of one octet may be applied, otherwise Activation/Deactivation MAC control element of four octets may be applied. The fields in an Activation/Deactivation MAC control element may be interpreted as follows. Ci: if there is an SCell configured with SCellIndex i, this field may indicate the activation/deactivation status of the SCell with SCellIndex i, else the MAC entity may ignore the Ci field. The Ci field may be set to "1" to indicate that the SCell with SCellIndex i is activated. The Ci field is set to "0" to indicate that the SCell with SCellIndex i is deactivated. R: Reserved bit, set to "0".

Figure 12:
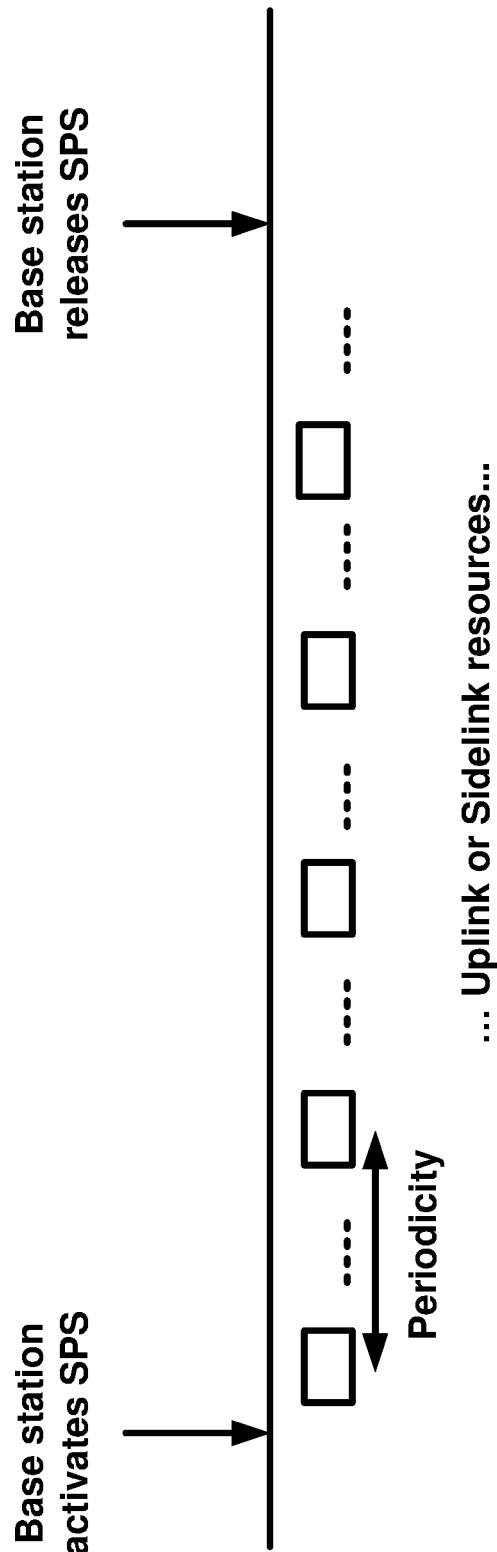
FIG. 12 is an example diagram depicting example uplink SPS activation and release as per an aspect of an embodiment of the present disclosure.

A base station may provide a periodic resource allocation. In a periodic resource allocation, an RRC message and/or a DCI may activate or release a periodic resource allocation. The UE may be allocated in downlink and/or uplink periodic radio resources without the need for transmission of additional grants by the base station. The periodic resource allocation may remain activated until it is released. The periodic resource allocation for example, may be called, semi-persistent scheduling or grant-free scheduling, or periodic multi-subframe scheduling, and/or the like. In this specification, the example term semi-persistent scheduling is mostly used, but other terms may also be equally used to refer to periodic resource allocation, e.g. grant-free scheduling. An example periodic resource allocation activation and release is shown in FIG. 12.

In the downlink, a base station may dynamically allocate resources (PRBs and MCS) to UEs at a TTI via the C-RNTI on PDCCH(s). A UE may monitor the PDCCH(s) in order to find possible allocation when its downlink reception is enabled (e.g. activity governed by DRX when configured). When CA is configured, the same C-RNTI applies to serving cells. Base station may also allocate semi-persistent downlink resources for the first HARQ transmissions to UEs. In an example, an RRC message may indicate the periodicity of the semi-persistent downlink grant. In an example, a PDCCH DCI may indicate whether the downlink grant is a semi-persistent one e.g. whether it can be implicitly reused in the following TTIs according to the periodicity defined by RRC.

In an example, when required, retransmissions may be explicitly signaled via the PDCCH(s). In the sub-frames where the UE has semi-persistent downlink resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE finds its C-RNTI on the PDCCH(s), the PDCCH allocation may override the semi-persistent allocation for that TTI and the UE may not decode the semi-persistent resources.

When CA is configured, semi-persistent downlink resources may be configured for the PCell and/or SCell(s). In an example, PDCCH dynamic allocations for the PCell and/or SCell(s) may override the semi-persistent allocation.

In the uplink, a base station may dynamically allocate resources (PRBs and MCS) to UEs at a TTI via the C-RNTI on PDCCH(s). A UE may monitor the PDCCH(s) in order to find possible allocation for uplink transmission when its downlink reception is enabled (activity governed by DRX when configured). When CA is configured, the same C-RNTI applies to serving cells. In addition, a base station may allocate a semi-persistent uplink resource for the first HARQ transmissions and potentially retransmissions to UEs. In an example, an RRC may define the periodicity of the semi-persistent uplink grant. PDCCH may indicate whether the uplink grant is a semi-persistent one e.g. whether it can be implicitly reused in the following TTIs according to the periodicity defined by RRC.

In an example, in the sub-frames where the UE has semi-persistent uplink resource, if the UE cannot find its C-RNTI on the PDCCH(s), an uplink transmission according to the semi-persistent allocation that the UE has been assigned in the TTI may be made. The network may perform decoding of the pre-defined PRBs according to the pre-defined MCS. Otherwise, in the sub-frames where the UE has semi-persistent uplink resource, if the UE finds its C-RNTI on the PDCCH(s), the PDCCH allocation may override the persistent allocation for that TTI and the UE's transmission follows the PDCCH allocation, not the semi-persistent allocation. Retransmissions may be either implicitly allocated in which case the UE uses the semi-persistent uplink allocation, or explicitly allocated via PDCCH(s) in which case the UE does not follow the semi-persistent allocation.

Vehicular communication services, represented by V2X services, may comprise of the following different types: V2V, V2I, V2N and/or V2P. V2X services may be provided by PC5 interface (sidelink) and/or Uu interface (UE to base station interface). Support of V2X services via PC5 interface may be provided by V2X sidelink communication, which is a mode of communication whereby UEs may communicate with each other directly over the PC5 interface. This communication mode may be supported when the UE is served by E-UTRAN and when the UE is outside of E-UTRA coverage. The UEs authorized to be used for V2X services may perform V2X sidelink communication.

The user plane protocol stack and functions for sidelink communication may be used for V2X sidelink communication. In order to assist the eNB to provide sidelink resources, the UE in RRC_CONNECTED may report geographical location information to the eNB. The eNB may configure the UE to report the complete UE geographical location information based on periodic reporting via the existing measurement report signaling.

In an example, for V2X communication, k SPS (e.g. k=8 or 16, etc.) configurations with different parameters may be configured by eNB and SPS configurations may be active at the same time. The activation/deactivation of an SPS configuration may signaled via a PDCCH DCI and/or an RRC message by eNB. The logical channel prioritization for Uu may be used.

For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

In an example, for unicast transmission of V2X messages, the V2X message may be delivered via Non-GBR bearers as well as GBR bearers. In order to meet the QoS requirement for V2X message delivery for V2X services, a Non-GBR QCI value and a GBR QCI value for V2X messages may be used. For broadcasting V2X messages, SC-PTM or MBSFN transmission may be used. In order to reduce SC-PTM/MBSFN latency, shorter (SC-)MCCH repetition period for SC-PTM/MBSFN, modification period for SC-PTM/MBSFN and MCH scheduling period for MBSFN may be supported. Reception of downlink broadcast of V2X messages in different carriers/PLMNs may be supported by having multiple receiver chains in the UE.

In an example embodiment, various DCI formats may be used for SPS scheduling. For example, the DCI format 0 may be used for uplink SPS. In an example, the fields for DCI format 0 may comprise one or more of the following fields: Carrier indicator e.g. 0 or 3 bits. Flag for format0/format1A differentiation e.g. 1 bit, where value 0 may indicate format 0 and value 1 may indicate format 1A. Frequency hopping flag, e.g. 1 bit. This field may be used as the MSB of the corresponding resource allocation field for resource allocation type 1. Resource block assignment and hopping resource allocation, e.g. $\lceil \log_2(N_{RB}^{UL}(N_{RB}^{UL}+1)/2) \rceil$ bits where $N_{RB}^{UL}$ may be the uplink bandwidth configuration in number of resource blocks. Modulation and coding scheme and redundancy version e.g. 5 bits. New data indicator e.g. 1 bit. TPC command for scheduled PUSCH e.g. 2 bits. Cyclic shift for DM RS and OCC index e.g. 3 bits. UL index e.g. 2 bits (this field may be present for TDD operation with uplink-downlink configuration 0). Downlink Assignment Index (DAI) e.g. 2 bits (this field may be present for cases with TDD primary cell and either TDD operation with uplink-downlink configurations 1-6 or FDD operation). CSI request e.g. 1, 2 or 3 bits. The 2-bit field may apply to UEs configured with no more than five DL cells and to UEs that are configured with more than one DL cell and when the corresponding DCI format is mapped onto the UE specific search space given by the C-RNTI, UEs that are configured by higher layers with more than one CSI process and when the corresponding DCI format is mapped onto the UE specific search space given by the C-RNTI, UEs that are configured with two CSI measurement sets by higher layers with the parameter csi-MeasSubframeSet, and when the corresponding DCI format is mapped onto the UE specific search space given by the C-RNTI; the 3-bit field may apply to the UEs that are configured with more than five DL cells and when the corresponding DCI format is mapped onto the UE specific search space given by the C-RNTI; otherwise the 1-bit field may apply. SRS request e.g. 0 or 1 bit. This field may be present in DCI formats scheduling PUSCH which are mapped onto the UE specific search space given by the C-RNTI. Resource allocation type e.g. 1 bit. This field may be present if $N_{RB}^{UL} \leq N_{RB}^{DL}$ where $N_{RB}^{UL}$ may be the uplink bandwidth configuration in number of resource blocks and $N_{RB}^{DL}$ may be the downlink bandwidth configuration in number of resource blocks. In example, one or more fields may be added to a DCI for SPS to enhance SPS scheduling process. In example, one or more of the fields may be replaced with new fields, or new values, or may be interpreted differently for SPS to enhance SPS scheduling process.

A base station may transmit one or more RRC messages to a wireless device to configure SPS. The one or more RRC messages may comprise SPS configuration parameters. Example SPS configuration parameters are presented below. In example, one or more parameters may be added to an RRC message for SPS to enhance SPS scheduling process. In example, one or more some of the parameters for an SPS in an RRC message may be replaced with new parameters, or new values, or may be interpreted differently for SPS to enhance SPS scheduling process. In an example, IE SPS-Config may be used by RRC to specify the semi-persistent scheduling configuration. In an example, the IE SPS-Config may be SEQUENCE {semiPersistSchedC-RNTI: C-RNTI; sps-ConfigDL: SPS-ConfigDL; sps-ConfigUL: SPS-ConfigUL}. SPS-ConfigDL IE may comprise semiPersistSchedIntervalDL, numberOfConfSPS-Processes, n1PUCCH-AN-PersistentList, twoAntennaPortActivated, n1PUCCH-AN-PersistentListP1, and/or other parameters. In an example, SPS-ConfigUL IE may comprise semiPersistSchedIntervalUL, implicitReleaseAfter, p0-NominalPUSCH-Persistent, p0-UE-PUSCH-Persistent, twoIntervalsConfig, p0-PersistentSubframeSet2, p0-NominalPUSCH-PersistentSubframeSet2, p0-UE-PUSCH- and/or PersistentSubframeSet2, and/or other parameters.

In an example, one or more RRC configuration parameters may comprise one or more of the following parameters to configure SPS for a wireless device. In an example, SPS configuration may include MCS employed for packet transmission of an MCS grant. In an example, implicitReleaseAfter IE may be the number of empty transmissions before implicit release, e.g. value e2 may corresponds to 2 transmissions, e3 may correspond to 3 transmissions and so on. In an example, n1PUCCH-AN-PersistentList IE, n1PUCCH-AN-PersistentListP1 IE may be the List of parameters: $n_{PUCCH}^{(1,p)}$ for antenna port P0 and for antenna port P1 respectively. Field n1-PUCCH-AN-PersistentListP1 IE may be applicable if the twoAntennaPortActivated-PUCCH-Format1a1b in PUCCH-ConfigDedicated-v1020 is set to true. Otherwise the field may not be configured.

In an example, numberOfConfSPS-Processes IE may be the number of configured HARQ processes for Semi-Persistent Scheduling. In an example, p0-NominalPUSCH-Persistent IE may be the parameter: $P_{O\_NOMINAL\_PUSCH}(0)$ used in PUSCH power control with unit in dBm and step 1. This field may be applicable for persistent scheduling. If choice setup is used and p0-Persistent is absent, the value of p0-NominalPUSCH for p0-NominalPUSCH-Persistent may be applied. If uplink power control subframe sets are configured by tpc-SubframeSet, this field may apply for uplink power control subframe set 1.

In an example, p0-NominalPUSCH-PersistentSubframeSet2 IE may be the parameter: $P_{O\_NOMINAL\_PUSCH}(0)$ used in PUSCH power control with unit in dBm and step 1. This field may be applicable for persistent scheduling. If p0-PersistentSubframeSet2-r12 is not configured, the value of p0-NominalPUSCH-SubframeSet2-r12 may be applied for p0-NominalPUSCH-PersistentSubframeSet2. E-UTRAN may configure this field if uplink power control subframe sets are configured by tpc-SubframeSet, in which case this field may apply for uplink power control subframe set 2. In an example, p0-UE-PUSCH-Persistent IE may be the parameter: $P_{O\_UE\_PUSCH}(0)$ used in PUSCH power control with unit in dB. This field may be applicable for persistent scheduling. If choice setup is used and p0-Persistent is absent, the value of p0-UE-PUSCH may be applied for p0-UE-PUSCH-Persistent. If uplink power control subframe sets are configured by tpc-SubframeSet, this field may be applied for uplink power control subframe set 1. In an example, p0-UE-PUSCH-PersistentSubframeSet2 IE may be the parameter: $P_{O\_UE\_PUSCH}(0)$ used in PUSCH power control with unit in dB. This field may be applicable for persistent scheduling. If p0-PersistentSubframeSet2-r12 is not configured, the value of p0-UE-PUSCH-SubframeSet2 may be applied for p0-UE-PUSCH-PersistentSubframeSet2. E-UTRAN may configure this field if uplink power control subframe sets are configured by tpc-SubframeSet, in which case this field may apply for uplink power control subframe set 2.

In an example, semiPersistSchedC-RNTI IE may be Semi-Persistent Scheduling C-RNTI. In an example, semiPersistSchedIntervalDL IE may be Semi-persistent scheduling interval in downlink. Its value may be in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, semiPersistSchedIntervalUL IE may be semi-persistent scheduling interval in uplink. Its value in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, twoIntervalsConfig IE may be trigger of two-intervals-Semi-Persistent Scheduling in uplink. If this field is present, two-intervals-SPS is enabled for uplink. Otherwise, two-intervals-SPS is disabled.

In an example, multiple downlink or uplink SPS may be configured for a cell. In an example, multiple SPS RNTIs may be configured when a plurality of SPSs is configured. A base station may transmit to a UE at least one RRC message comprising SPS configuration parameters comprising a first SPS RNTI and a second SPS RNTI. For example, a first SPS RNTI may be configured for a first SPS configuration (e.g. for VOIP), and a second SPS RNTI may be configured for a second SPS configuration (e.g. for V2X communications). The UE may monitor PDCCH for at least DCIs corresponding to the first SPS RNTI and the second SPS RNTI.

When Semi-Persistent Scheduling is enabled by RRC, at least one or more of the following information may be provided: Semi-Persistent Scheduling C-RNTI(s); Uplink Semi-Persistent Scheduling interval semiPersistSchedIntervalUL, number of empty transmissions before implicit release implicitReleaseAfter, if Semi-Persistent Scheduling is enabled for the uplink; Whether twoIntervalsConfig is enabled or disabled for uplink, for TDD; Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink; and/or other parameters.

When Semi-Persistent Scheduling for uplink or downlink is disabled by RRC, the corresponding configured grant or configured assignment may be discarded.

In an example, after a Semi-Persistent downlink assignment is configured, the MAC entity may consider sequentially that the Nth assignment occurs in the subframe for which: (10*SFN+subframe)=[(10*SFNstart time+subframestart time)+N*semiPersistSchedIntervalDL] modulo 10240. Where SFNstart time and subframestart time may be the SFN and subframe, respectively, at the time the configured downlink assignment were (re)initialized.

In an example, after a Semi-Persistent Scheduling uplink grant is configured, the MAC entity may: if twoIntervalsConfig is enabled by upper layer: set the Subframe_Offset according to Table below. else: set Subframe_Offset to 0. consider sequentially that the Nth grant occurs in the subframe for which: (10*SFN+subframe)=[(10*SFNstart time+ subframestart time)+N*semiPersistSchedIntervalUL+Subframe_Offset*(N modulo 2)] modulo 10240. Where SFNstart time and subframestart time may be the SFN and subframe, respectively, at the time the configured uplink grant were (re-)initialised. FIG. 11. shows example subframe offset values.

The MAC entity may clear the configured uplink grant immediately after implicitReleaseAfter number of consecutive MAC PDUs containing zero MAC SDUs have been provided by the Multiplexing and Assembly entity, on the Semi-Persistent Scheduling resource. Retransmissions for Semi-Persistent Scheduling may continue after clearing the configured uplink grant.

In an example embodiment, SPS configurations may be enhanced to support transmission of various V2X traffic and/or voice traffic by a UE. There is a need to support multiple SPS configurations for a UE. For example, a UE supporting V2X may need to support multiple uplink SPS configurations for transmitting various periodic (or semi-periodic) traffic and/or voice traffic in the uplink. Other examples may be provided. For example, CAM messages in V2X may be semi-periodic. In some scenarios, CAM message generation may be dynamic in terms of size, periodicity and timing. Such changes may result in misalignment between SPS timing and CAM timing. There may be some regularity in size and periodicity between different triggers. Enhanced SPS mechanisms may be beneficial to transmit V2X traffic, voice traffic, and/or the like. In an example, various SPS periodicity, for example 100 ms and 1 s may be configured.

In an example, multiple SPS configurations may be configured for UU and/or PC5 interface. An eNB may configure multiple SPS configurations for a given UE. In an example, SPS configuration specific MCS (e.g. MCS as a part of the RRC SPS-configuration) and/or SPS-configuration-specific periodicity may be configured. In an example, some of the SPS configuration parameters may be the same across multiple SPS and some other SPS configuration parameters may be different across SPS configurations. The eNB may dynamically trigger/release the different SPS-configurations employing (E)PDCCH DCIs. In an example, the multiple SPS configurations may be indicated by eNB RRC signaling. The dynamical triggering and releasing may be performed by eNB transmitting (E)PDCCH DCI to the UE employing SPS C-RNTI.

In an example embodiment, a UE may transmit UE SPS assistant information to a base station indicating that the UE does not intend and/or intend to transmit data before a transmission associated to an SPS configuration. The eNB may acknowledge the UE indication. For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

Some example V2X messages are CAM, DENM and BSM. For Example, CAM message may have the following characteristics. Content: status (e.g. time, position, motion state, activated system), attribute (data about dimension, vehicle type and role in the road traffic). Periodicity: typical time difference between consecutive packets generation is bounded to the [0.1, 1] sec range. Length: Variable. For Example, DENM message may have the following characteristics. Content: Contain information related to a variety of events. Periodicity: Event triggers the DENM update. In between two consequent DENM updates, it is repeated with a pre-defined transmission interval. Length: Fixed until DENM update. For Example, BSM message may have the following characteristics. Content: Part I contains some of the basic vehicle state information such as the message ID, vehicle ID, vehicle latitude/longitude, speed and acceleration status. Part II contains two option data frames: VehicleSafetyExtension and VehicleStatus. Periodicity: Periodic, the periodicity may be different considering whether BSM part II is included or not and the different application type. Length: Fixed, with different message size considering whether part II exists or not.

In an example, SPS may be employed for the transmission of BSM, DENMs and CAMs. For example, the UE's speed/position/direction changes within a range. BSM may be periodic traffic with a period of 100 ms. The message size of BSM may be in the range of 132~300 Bytes without certificate and 241~409 Bytes with certificate. DENMs, once triggered, may be transmitted periodically with a given message period which may remain unchanged. The message size of the DENM may be 200~1200 Bytes. If the UE's speed/position/direction does not change or changes within a small range, the CAM generation periodicity may be fixed.

The SPS may be supported for the UL and DL VoIP transmission. In the current SPS specification, the base station may configure SPS periodicity via dedicated RRC signaling. The periodicity of VoIP packet is generally fixed.

The UE may transmit traffic associated with multiple V2X services, which may require different periodicity and packet sizes. The SPS TB size and period may be adapted to different V2X services. Multiple parallel SPS processes may be activated at the UE. The SPS processes may differ in the amount of resource blocks (RBs) allocated and/or SPS period and may correspond to different types of V2X packets. Once the AS layer of UE receives the V2X packets from upper layer, the UE may trigger V2X packet transmissions on the corresponding SPS grant. Multiple UL SPS configurations may be configured for the UE.

The eNB may configure different SPS C-RNTIs for different SPS processes of the UE. SPS activation and release mechanism may be implemented. Employing at least one or more SPS RNTIs, the eNB may trigger which SPS process is activated or released. In an example implementation, in order to support multiple SPS configurations different SPS C-RNTIs may be configured for different SPS traffic types. For example, a first SPS C-RNTI may be configured for SPS configuration to transmit voice traffic, a second SPS C-RNTI may be configured for SPS configuration to transmit a V2X traffic. An eNB may transmit one or more RRC messages comprising multiple SPS configuration parameters. The multiple SPS configuration parameters may comprise multiple SPS-RNTI parameters for multiple SPS traffic types (e.g. multiple UL SPS configurations).

In the current LTE standard, a maximum of one downlink SPS and/or one uplink SPS may be configured for the PCell. Configuration of multiple SPSs are not supported for the PCell or any other cell. An SPS RNTI is configured for the UE to support one DL SPS configuration and/or one UL SPS configuration. The current SPS-Config IE comprises: semiPersistSchedRNTI: RNTI; sps-ConfigDL: SPS-ConfigDL; sps-ConfigUL: SPS-ConfigUL. Example embodiments enhance SPS configuration and processes to enable multiple SPS configuration for downlink, uplink and/or sidelink of a cell.

In an example, CAM message generation may be dynamic in terms of size, periodicity and timing. Such changes may result in misalignment between SPS timing and CAM timing. There may be some regularity in size and periodicity between different triggers. UE assistance may be needed to trigger and/or employ SPS.

Figure 17:
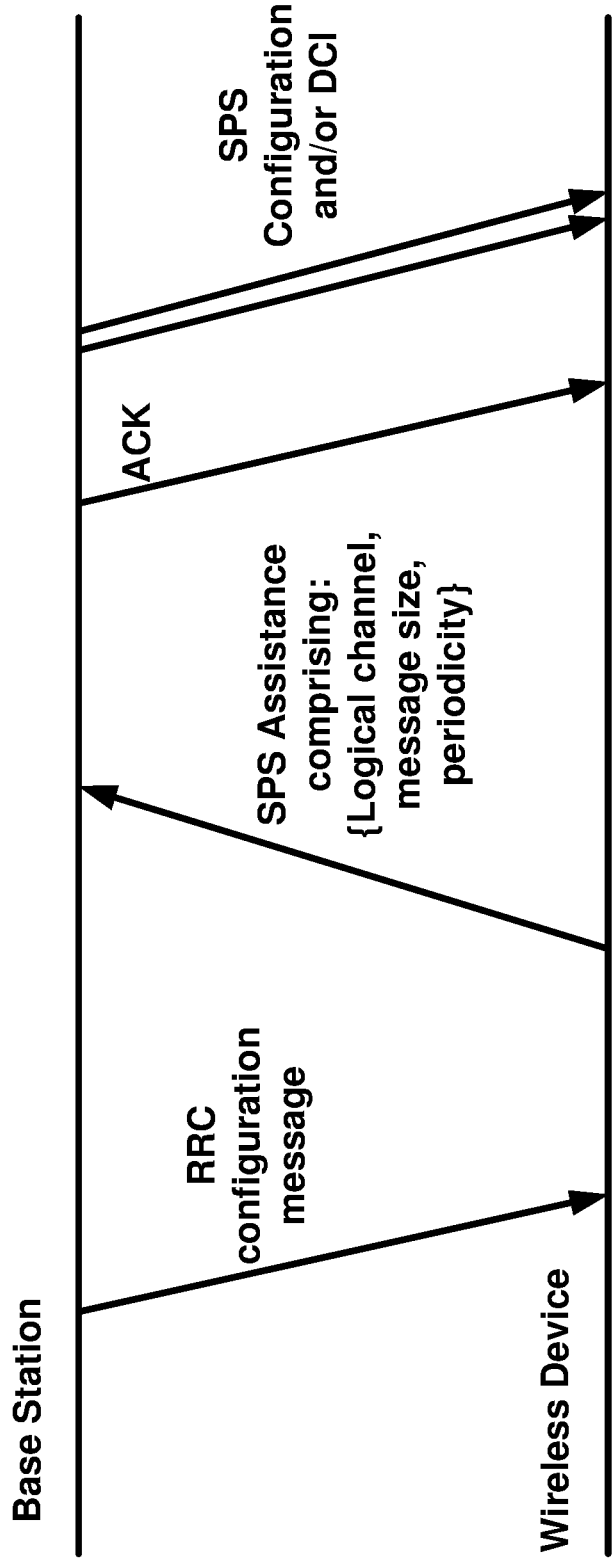
FIG. 17 is an example diagram depicting example signaling flow as per an aspect of an embodiment of the present disclosure.

FIG. 17 shows an example signaling flow for configuring and transmitting UE SPS assistance. In an example embodiment, a base station may transmit one or more RRC messages to configure reporting of UE assistance information. A UE may transmit UE SPS assistance information to a base station indicating that the UE intends to transmit data associated to an SPS configuration. In response, the base station may transmit to the UE an acknowledgement to the UE indication. A UE may provide UE assistance information to a base station for V2X communications. The UE assistance information may include parameters related to SPS traffic and configurations. Triggering of UE assistance information transmission may be left to UE implementation. For instance, the UE may be allowed to report the UE assistance information when change in an estimated periodicity and/or a timing offset of packet arrival occurs.

In an example, a base station may provide one or more SPS configurations for the UE via RRC signaling. SPS configurations may be for transmission of SPS traffic via a downlink, an uplink and/or via a sidelink. When a UE needs to transmit a type of message employing SPS, the UE may report UE SPS assistance information about one or more SPS traffic types to the base station. UE SPS assistance information may indicate at least one of the following SPS assistance parameters for an SPS traffic type. The SPS assistance parameters may indicate at least one of the following: message type, logical channel, traffic/message size, SPS configuration index, traffic type, and/or traffic periodicity. The base station may transmit an SPS transmission grant (e.g. DCI activating an SPS) based on the UE assistance report. The base station may provide an SPS DCI grant for an SPS configuration and SPS radio resources based on the assistance information transmitted by the UE. After receiving the grant, the UE may initialize the corresponding SPS configuration and may transmit the data via the radio resources allocated to the UE. The UE assistance information may enable the base station to determine logical channels and traffic priority and size. The base station may configure/activate the corresponding SPS for the UE. For example, legacy mechanisms do not provide UE SPS assistance information comprising at least one logical channel and other assistance parameters. This improved process enhances SPS transmission efficiency in the uplink.

In an example, multiple SPSs may be activated in parallel. For example, a new service may be triggered while a previous service is on-going. In an example, the UE may transmit an assistance message to the base station indicating new information about new messages (SPS traffic) for transmission. The base station may provide a second SPS transmission grant for transmission of the new service/message(s). The UE may select the second SPS configuration and corresponding resources for transmission of new SPS traffic. In an example, a previous SPS grant and a new SPS grant may continue in parallel.

In an example, a UE may transmit traffic associated with multiple V2X services, which may require different periodicity and packet sizes. The SPS TB size and period may be adapted to different V2X services. Multiple parallel SPS processes may be activated in parallel at the UE. Different SPS processes may differ in the number of allocated resource blocks (RBs) and/or SPS periodicity and may correspond to different types of V2X packets. Once the radio layer of UE receives the V2X packets from a V2X application, the UE may trigger V2X packet transmissions on the corresponding SPS grant. Multiple UL SPS configurations may be configured for a UE.

When configuration of multiple SPSs are required, legacy mechanisms may be extended to support multiple SPSs. The base station may configure different SPS RNTIs for different SPS processes of the UE. SPS activation and release mechanism may be implemented. The base station may trigger which SPS process is activated or released employing at least one or more SPS RNTIs. In an example implementation, in order to support multiple SPS configurations different SPS RNTIs may be configured for different SPS configurations. For example, a first SPS RNTI may be configured for SPS configuration to transmit a first V2X traffic, a second SPS RNTI may be configured for SPS configuration to transmit a second V2X traffic. A base station may transmit one or more RRC messages comprising multiple SPS configuration parameters. The multiple SPS configuration parameters may comprise multiple SPS-RNTI parameters for multiple SPS configurations (e.g. multiple UL SPS configurations). Some of the example embodiments may implement multiple SPS RNTIs, and some may implement a single SPS RNTI.

A UE configured with multiple SPS RNTIs may need to monitor search space of PDCCH for multiple SPS RNTIs. When the number of required SPS configurations increases, this mechanism may increase UE processing requirements and/or power consumption. Extension of legacy mechanisms, for implementation of multiple SPS configurations, increases UE processing requirements and battery power consumption. In an example, a UE may be configured with many SPS configurations (e.g. 4, or 8, etc) for different types of V2X traffic. There is a need to improve SPS configuration and activation/release mechanisms in a base station and wireless device when multiple SPSs are configured. Example embodiments may increase signaling overhead, however the potential benefits outweigh the increased overhead when V2X communication is enabled. Example embodiments improve base station and UE implementations, enhance network performance, reduce UE monitoring requirements, and reduce battery power consumption, when multiple SPSs are configured for a given UE for transmission of SPS traffic via an uplink (UL) or a sidelink (SL).

Figure 13:
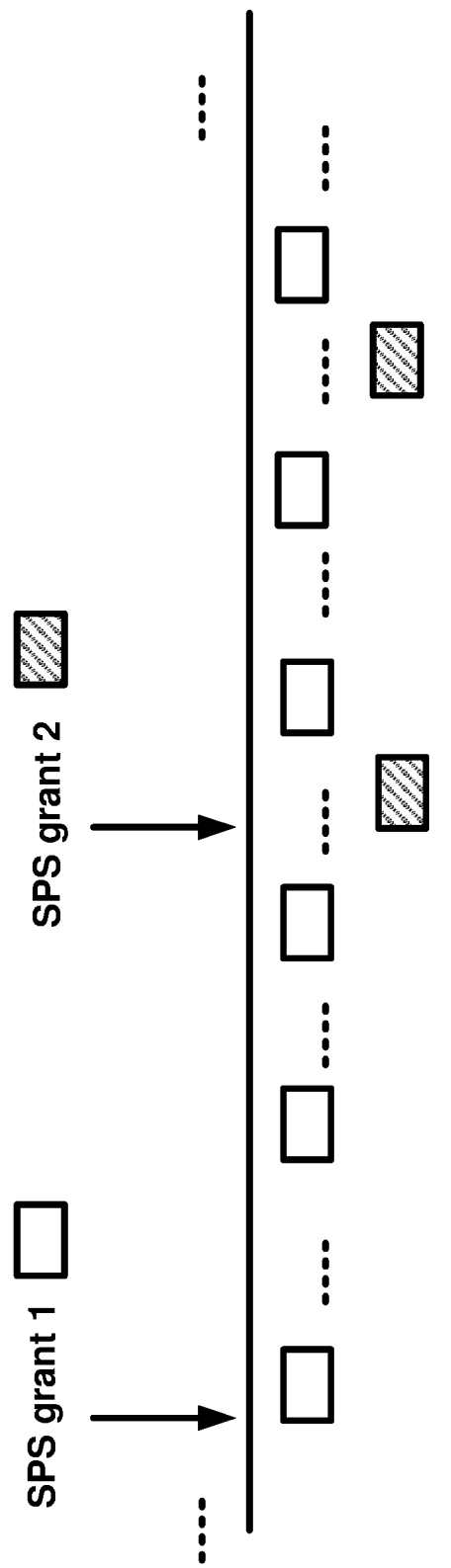
FIG. 13 is an example diagram depicting example multiple parallel SPSs as per an aspect of an embodiment of the present disclosure.

In an example, multiple SPSs may be activated in parallel. For example, a new SPS may be triggered while a previous SPS is on-going. In an example, the UE may transmit to a base station a message comprising assistant information indicating that the UE requires new SPS resources for transmission of new messages. The assistant information may comprise information about at least one SPS traffic type, e.g. logical channel, periodicity, message size, and/or the like. The base station may provide an SPS grant for the new service/message(s). The UE may employ an SPS configuration and a corresponding SPS resources for uplink transmission of a corresponding traffic. In an example, a previous SPS grant and a new SPS grant may be employed in parallel. FIG. 13 shows an example when multiple SPS grants are activated in parallel. A base station may transmit SPS grant 1 in a first subframe for transmission of a first SPS traffic. The base station may transmit SPS grant 2 in a second subframe for transmission of a second SPS traffic. The first SPS grant and the second SPS grant may have different parameters, for example, may comprise different RBs assignments, may have different periodicity, may have different DCI and RRC configuration parameter(s), and/or the like.

In an example, multiple downlink, uplink, and/or sidelink SPSs may be configured for a cell. In an example, one or more SPS RNTIs may be configured when a plurality of SPSs are configured. In an example, an RRC message may comprise an index identifying an SPS configuration of a cell. In an example, the DCI employing SPS RNTI and triggering an SPS may include the index of the SPS that is triggered (initialized, activated) or released (deactivated). For example, the DCI activating or releasing an uplink SPS corresponding to a V2X SPS traffic may comprise an UL SPS configuration index field (e.g. 3 bits) identifying the SPS configuration corresponding the SPS configuration index. SPS configuration index may indicate the index of one of one or more SL/UL SPS configurations. Using this enhanced mechanism multiple SPSs may be configured using the same SPS RNTI (e.g. for V2X traffic). This may reduce UE battery power consumption and provide flexibility in configuring multiple SPSs.

Figure 14:
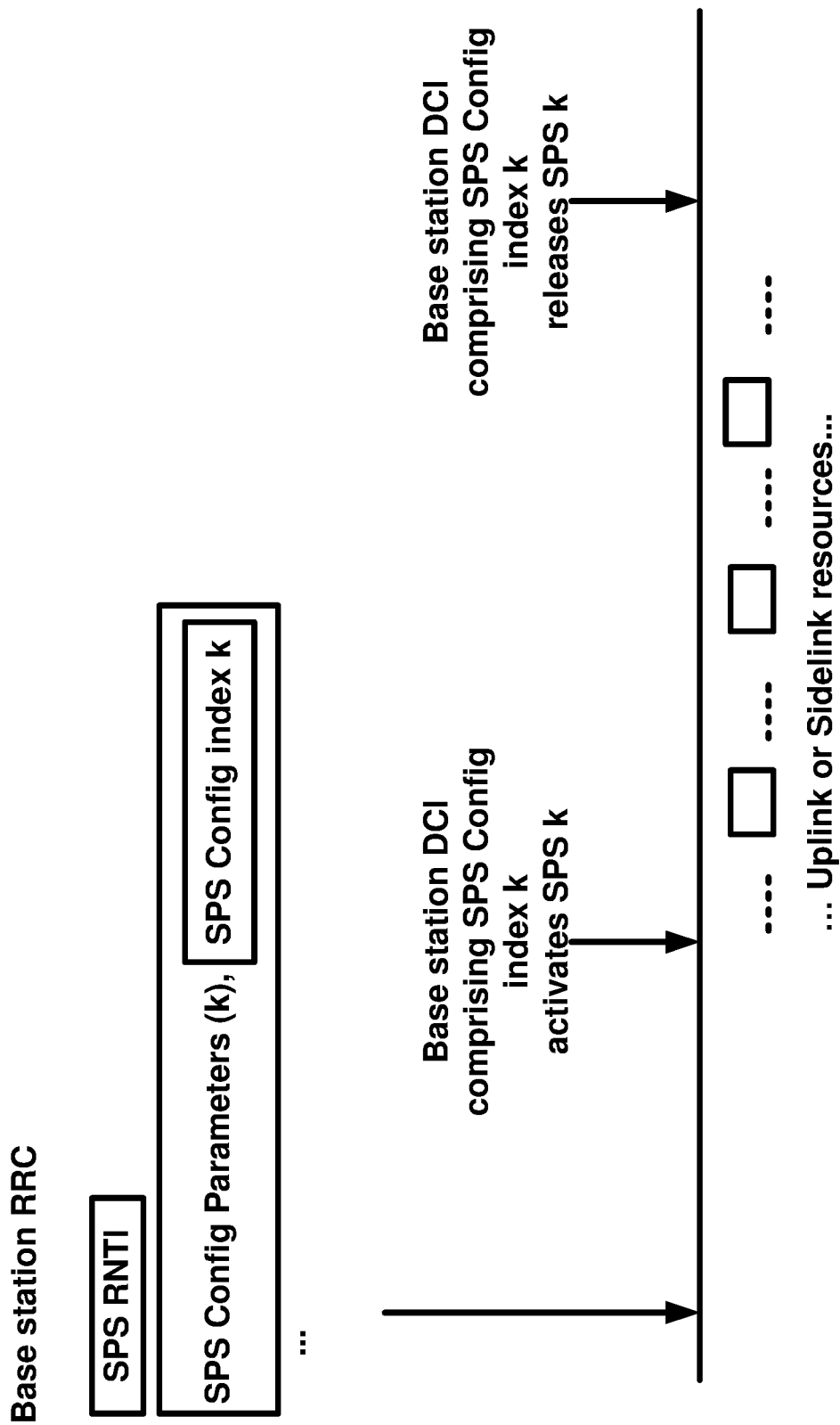
FIG. 14 is an example diagram depicting example RRC configuration and example DCIs as per an aspect of an embodiment of the present disclosure.

In an example embodiment, when one or more SPS grant configurations are configured for a UE, for example, when one or more SPS-ConfigUL and/or SPS-ConfigSL are configured on a cell or when one or more SPS grant configurations are configured within an SPS-ConfigUL and/or SPS-ConfigSL, RRC configuration parameters may comprise an SPS configuration index. One or more uplink SPS configuration parameters may be assigned to (associated with) the same SPS RNTI. Different SPS configurations (e.g. having different SPS periodicity) may be assigned to the same SPS RNTI, and may be identified by different SPS configuration indexes. In an example embodiment, one or more SPS configurations (e.g. multiple periodicity, MCS, and/or other parameters) may be triggered employing the same SPS RNTI, and using different SPS configuration indexes. FIG. 14 shows an example RRC configuration and example DCIs activating and releasing an SPS for an uplink or a sidelink. A similar mechanism may be applied to the downlink.

The example mechanism may be applied to downlink, uplink and/or sidelink SPS configurations. For example, when one or more SPS grant configurations are configured for transmission of various V2X traffic via sidelink by a UE, for example, when one or more SPS configurations are configured for a sidelink of a cell, RRC configuration parameters may comprise an SPS RNTI for the sidelink, and one or more SPS configuration indexes (each associated with a sidelink SPS RRC configuration). One or more uplink SPS configuration parameters may be assigned to (associated with) the same sidelink SPS RNTI for sidelink SPS activation and release. Different SPS configurations (e.g. having different periodicity) may be assigned to the same sidelink SPS RNTI, and may be identified by different SPS configuration indexes. In an example embodiment, one or more sidelink SPS configurations (e.g. multiple periodicity, MCS, and/or other parameters) may be triggered employing the same sidelink SPS RNTI for transmission of SPS V2X traffic via a sidelink.

In an example, SPS-ConfigUL1 may be assigned SPS RNTI and SPS-ConfigIndex1, and SPS-ConfigUL2 may be assigned SPS RNTI and SPS-ConfigIndex2. A base station may transmit one or more RRC messages comprising configuration parameters of one or more cells (e.g. PCell and/or SCell(s)). The configuration parameters may comprise configuration parameters for one or more SPSs. The configuration parameters may comprise the SPS RNTI, SPS-ConfigIndex1 and SPS-ConfigIndex2.

In an example, SPS-ConfigUL IE may comprise an SPS RNTI and an SPS-ConfigIndex1 and an SPS-ConfigIndex2. One or more first SPS configuration parameters may be associated with SPS-ConfigIndex1 and one or more second SPS configuration parameters may be associated with SPS-ConfigIndex2. Example of SPS configuration parameters maybe periodicity, HARQ parameter(s), MCS, grant size, and/or any other SPS configuration parameter presented in RRC SPS configuration. A base station may transmit one or more RRC messages comprising configuration parameters of one or more cells (e.g. PCell and/or SCell(s)). The configuration parameters may include configuration parameters for one or more SPSs. The configuration parameters may comprise the SPS RNTI, SPS-ConfigIndex1 and SPS-ConfigIndex2.

The UE configured with SPS configurations may monitor PDCCH and search for a DCI associated with the SPS RNTI (e.g. scrambled with SPS-RNTI). The base station may transmit a DCI associated to SPS RNTI to the UE to activate or release an SPS grant. The UE may decode a DCI associated with the SPS RNTI. The DCI may comprise one or more fields comprising information about the grant. The DCI may further comprise an SPS configuration index. The SPS configuration index may determine which one of the SPS configurations are activated or released.

Some of example fields in the DCI grants for an SPS in a legacy system is employed. Many of fields are marked by N/A. In an example embodiment, one of the existing fields (e.g. one of the N/A fields), or a new field may be introduced in a DCI for indicating the SPS configuration index. An SPS configuration index field in the DCI may identify which one of the SPS configurations is activated or released. The UE may transmit or receive data according the grant and SPS configuration parameters.

In an example embodiment, a wireless device may receive at least one message comprising: a semi-persistent scheduling (SPS) cell radio network temporary identifier (RNTI); a first SPS configuration parameter(s); a second SPS configuration parameter(s); a first SPS configuration index value associated with the first SPS configuration parameters; and a second SPS configuration index value associated with the second SPS configuration parameters. The wireless device may receive a downlink control information (DCI) associated with the SPS RNTI. The DCI comprises one or more fields of an SPS grant and an SPS configuration index value. The wireless device may transmit/receive SPS traffic on radio resources identified in the SPS grant considering the SPS configuration parameters associated with the SPS configuration index value. The SPS configuration parameter associated with the SPS configuration index may include, for example, SPS periodicity, MCS, radio resource parameters, and/or other SPS parameters included in SPS configurations.

Figure 15:
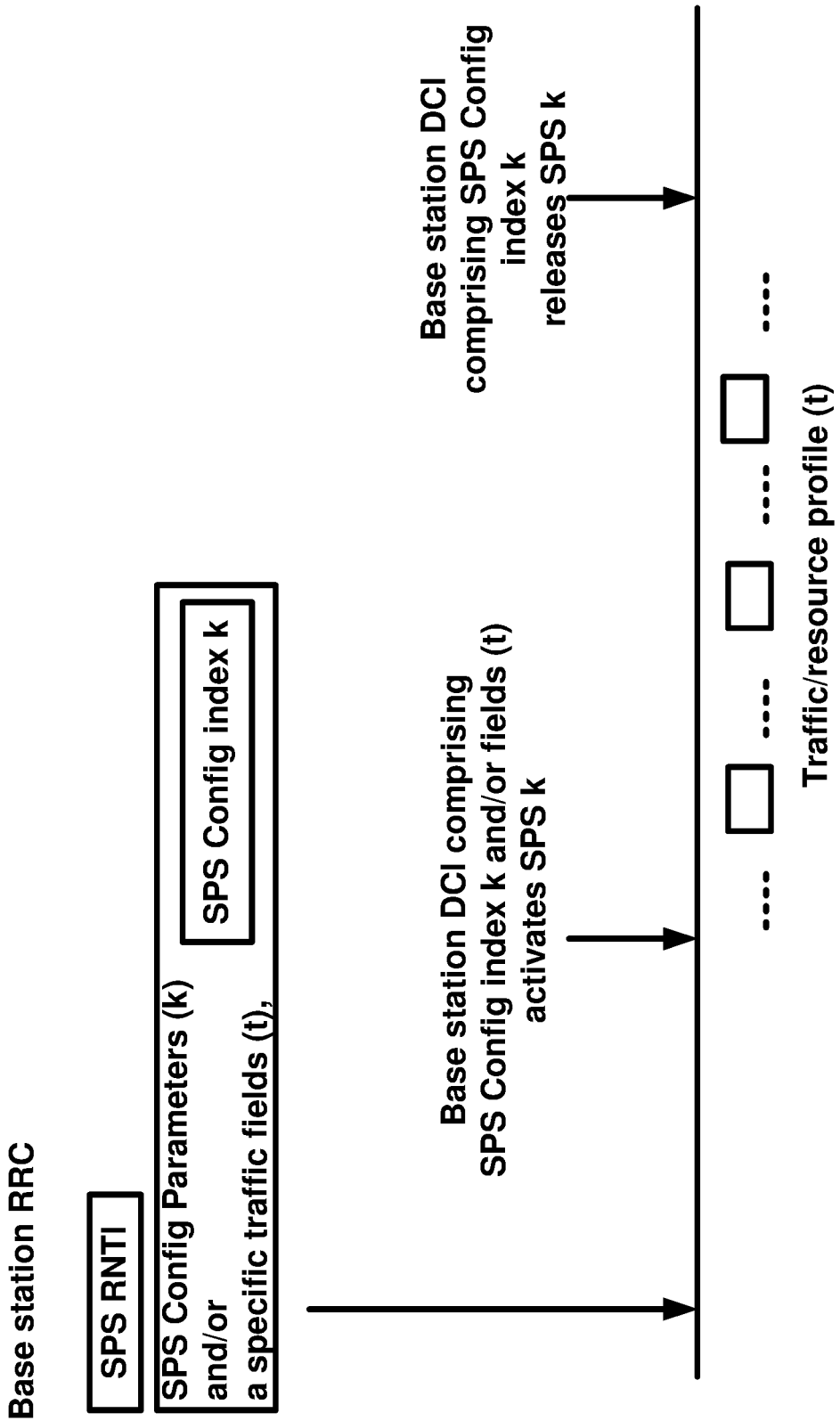
FIG. 15 is an example diagram depicting example RRC configuration and example DCIs as per an aspect of an embodiment of the present disclosure.

In an example embodiment, an SPS grant may be for a specific message type. In current mechanisms, SPS configuration parameters and/or an SPS DCI grant do(es) not comprise information on traffic types associated with the grant. In an example embodiment, a wireless device may receive at least one message comprising: a semi-persistent scheduling (SPS) cell radio network temporary identifier (RNTI); and a sequence of one or more SPS configuration IEs. An SPS configuration IE may comprise SPS configuration parameters, SPS configuration index, and/or one or more fields indicating a traffic/resource profile (e.g. traffic index value) associated with the SPS configuration parameters. The index for the traffic type may be a logical channel identifier, bearer identifier, V2X traffic type identifier, a service type, a radio resource type and/or the like. The one or more fields may also determine a relative priority of the traffic type compared with other traffics. The wireless device may receive a downlink control information (DCI) associated with the SPS RNTI. The DCI may comprise at least one of SPS Config index and/or traffic/resource profile fields. Example embodiments may increase signaling overhead, however the potential benefits outweigh the increased overhead when communications of various traffic types are enabled. Example embodiments enable a UE and a base station to provide SPS (periodic) resources for one or more specific traffic types. This process enhances UE uplink traffic multiplexing and enhances overall spectral efficiency of the air interface. In an example, a grant can be provided for transmission of traffic with high priority, while lower priority traffic may use dynamic grants. FIG. 15 shows an example SPS configuration and example activation/release DCIs for transmission of various traffic types. When RRC SPS configuration parameters and/or one or more DCI fields indicate traffic/resource profile, the UE may transmit uplink data including the corresponding traffic type in the corresponding SPS grant.

In an example, SPS configurations may include a sequence of various configuration parameters. In an example embodiment, a wireless device may receive at least one message comprising: a semi-persistent scheduling (SPS) cell radio network temporary identifier (RNTI); a sequence of one or more SPS configuration parameters, e.g. periodicities. In an example, each of the one or more SPS configurations parameters (e.g. SPS Config IE comprising a periodicity IE value) may be associated with an SPS configuration index. The wireless device may receive a downlink control information (DCI) associated with the SPS RNTI. The DCI may comprise one or more fields of an SPS grant (e.g. a first SPS configuration index value). The wireless device may activate (transmit/receive) SPS traffic on radio resources identified in the SPS grant considering the SPS configuration parameters (e.g. associated with the first SPS configuration index value). In an example, the DCI may comprise one or more fields comprising traffic/resource profile parameters.

Figure 16:
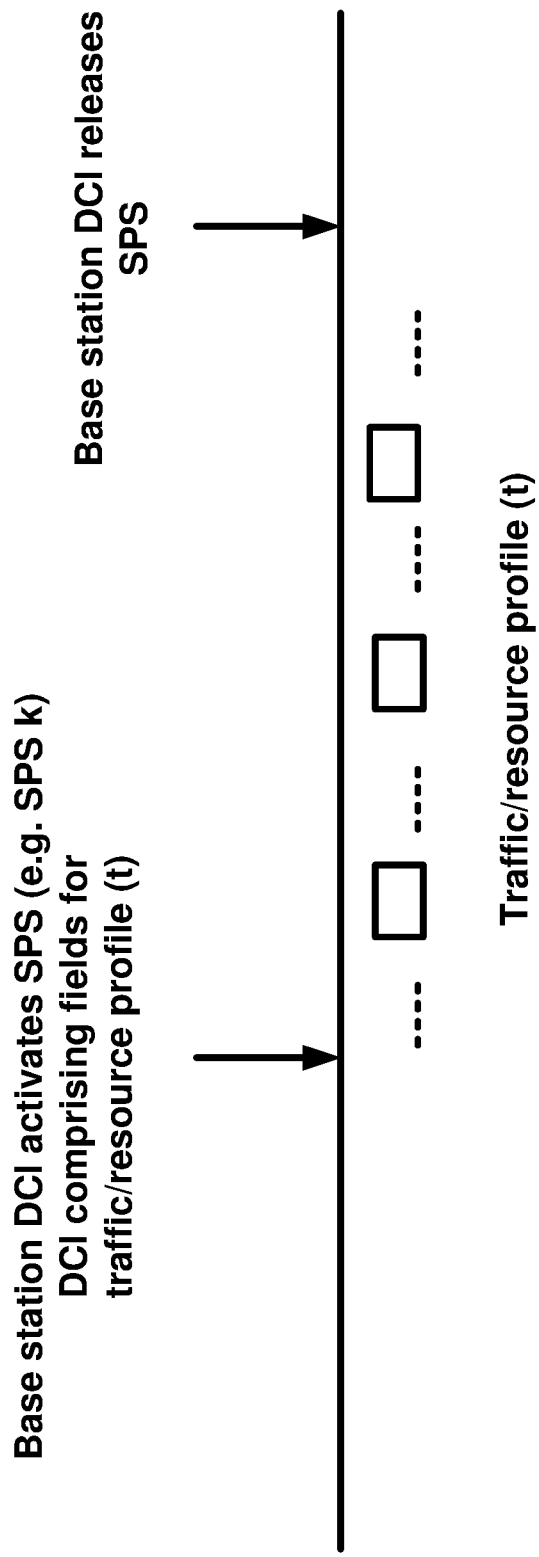
FIG. 16 is an example diagram depicting example DCIs as per an aspect of an embodiment of the present disclosure.

The DCI may comprise one or more fields indicating a traffic/resource profile (e.g. traffic/resource index value) associated with the SPS configuration parameters. The index for the traffic type may be a logical channel identifier, bearer identifier, V2X traffic type identifier, a service type, a radio resource type and/or the like. In an example, the one or more fields may also determine a relative priority of the traffic type compared with other traffics. Example embodiments may increase signaling overhead, however the potential benefits outweigh the increased overhead when communications of various traffic types are enabled. Example embodiments enable a UE and a base station to provide SPS (periodic) resources for one or more specific traffic types. This process enhances UE uplink traffic multiplexing and enhances overall spectral efficiency of the air interface. In an example, a grant can be provided for transmission of traffic with high priority, while lower priority traffic may use dynamic grants. FIG. 16 shows an example activation/release DCIs for transmission of various traffic types. When one or more DCI fields indicate traffic/resource profile, the UE may transmit uplink data including the corresponding traffic type in the corresponding SPS grant.

In an example, an RRC IE (e.g., MAC-MainConfig) may comprise a skipUplinkTx IE configured as setup. The skipUplinkTxSPS IE and/or the skipUplinkTxDynamic IE may be configured as true. In an example, if skipUplinkTxDynamic is configured, the UE may skip UL transmissions for an uplink grant other than a configured uplink grant if no data is available for transmission in the UE buffer. In an example, if skipUplinkTxSPS is configured, the UE may skip UL transmissions for a configured uplink grant if no data is available for transmission in the UE buffer. In an example, the base station may configure skipUplinkTxSPS when semiPersistSchedIntervalUL is shorter than sf10. In an example, if skipUplinkTxSPS is configured, the UE may ignore the implicitReleaseAfter field. In an example, if the MAC entity is not configured with skipUplinkTxSPS, the MAC entity may clear the configured uplink grant immediately after implicitReleaseAfter number of consecutive new MAC PDUs each containing zero MAC SDUs have been provided by the Multiplexing and Assembly entity, on the Semi-Persistent Scheduling resource.

In an example, PHICH may be used for transmission of HARQ acknowledgments (e.g., ACK/NACK) in response to UL-SCH transmission. Multiple PHICHs may exist in a cell. The PHICH may be seen as a one-bit scheduling grant commanding a retransmission on the UL-SCH (e.g., for non-adaptive retransmission and in the absence of dynamic grants). In an example, there may be one PHICH transmitted per received transport block and TTI. In an example, when uplink spatial multiplexing is used on a cell, two PHICHs may be used to acknowledge the transmission, one per transport block.

In an example, a Logical Channel Prioritization procedure may be applied when a new transmission is performed. The logical channel prioritization procedure may be used to multiplex data from logical channels and/or MAC control elements. The multiplexing may be based on relative priorities of the logical channels and/or the MAC CEs. In an example, the logical channel priorities (e.g., for performing logical channel prioritization) may be configured by RRC.

In an example, the IE LogicalChannelConfig may be used to configure the logical channel parameters. The LogicalChannelConfig IE may configure a plurality of parameters, e.g., bitRateQueryProhibitTimer, bucketSizeDuration, 1aa-Allowed, logicalChannelGroup, logicalChannelSR-Mask, logicalChannelSR-Prohibit, prioritisedBitRate and priority. In an example, bitRateQueryProhibitTimer may be a timer used for bit rate recommendation query. A value of s0 may mean 0 s, s0dot4 mean 0.4 s and so on. In an example, bucketSizeDuration may be used as bucket size duration in a logical channel prioritization procedure. In an example, 1aa-Allowed may indicate whether the data of a logical channel is allowed to be transmitted via UL of LAA SCells. Value TRUE may indicate that the logical channel is allowed to be sent via UL of LAA SCells. Value FALSE may indicate that the logical channel is not allowed to be sent via UL of LAA SCells. In an example, logicalChannelGroup may indicate mapping of logical channel to logical channel group for BSR reporting. In an example, logicalChannelSR-Mask may be used for controlling SR triggering on a logical channel basis when an uplink grant is configured. In an example, a value TRUE of logicalChannelSR-Prohibit may indicate that logicalChannelSR-ProhibitTimer is enabled for the logical channel. The network may configure the field (e.g., indicates value TRUE) if logicalChannelSR-Prohibit-Timer is configured. In an example, prioritisedBitRate may indicate Prioritized Bit Rate for logical channel prioritization procedure. In an example, priority may indicate a logical channel priority.

In an example, a MAC packet (e.g., MAC PDU or a corresponding transport block (TB)) may comprise a MAC header, zero or more MAC Service Data Units (MAC SDU), zero or more MAC control elements, and optionally padding. In an example, the MAC header and the MAC SDUs may be of variable sizes. In an example, a MAC PDU header may comprise one or more MAC PDU subheaders. A subheader may correspond to a MAC SDU, a MAC control element or padding.

In an example, a MAC PDU subheader may comprise a five or six header fields R/F2/E/LCID/(F)/L, for example, except the last subheader in the MAC PDU and for fixed sized MAC control elements. In an example, the last subheader in the MAC PDU and subheaders for fixed sized MAC control elements may comprise a four header fields R/F2/E/LCID. In an example, a MAC PDU subheader corresponding to padding may comprise a four header fields R/F2/E/LCID.

In an example, MAC PDU subheaders may have the same order as the corresponding MAC SDUs, MAC control elements and padding. In an example, MAC control elements may be placed before any MAC SDU. In an example, padding may occur at the end of the MAC PDU, except when single-byte or two-byte padding is required. In an example, padding may have any value and the MAC entity may ignore it. In an example, when padding is performed at the end of the MAC PDU, zero or more padding bytes are allowed.

In an example, when single-byte or two-byte padding is required, one or two MAC PDU subheaders corresponding to padding are placed at the beginning of the MAC PDU before any other MAC PDU subheader. In an example, a maximum of one MAC PDU can be transmitted per TB per MAC entity.

In an example, for synchronous HARQ, the MAC entity may be configured with a maximum number of HARQ transmissions and/or a maximum number of Msg3 HARQ transmissions by RRC, e.g., with parameters maxHARQ-Tx and maxHARQ-Msg3Tx respectively. For transmissions on HARQ processes and logical channels except for transmission of a MAC PDU stored in the Msg3 buffer, the maximum number of transmissions may be set to maxHARQ-Tx. For transmission of a MAC PDU stored in the Msg3 buffer, the maximum number of transmissions may be set to maxHARQ-Msg3Tx.

In an example, when a HARQ feedback (e.g., ACK or NACK) is received for a TB, the HARQ process may set HARQ_FEEDBACK to the received value. In an example, if the HARQ entity requests a new transmission and if UL HARQ operation is synchronous, the HARQ process may set a CURRENT_TX_NB variable to 0. The HARQ process may set HARQ_FEEDBACK to NACK and may set CURRENT_IRV to 0. In an example, if UL HARQ operation is not synchronous, the HARQ process may set CURRENT_IRV to the index corresponding to the redundancy version value provided in the HARQ information.

In an example, if the HARQ entity requests a new transmission, the HARQ process may store the MAC PDU in the associated HARQ buffer. The HARQ process may store the uplink grant received from the HARQ entity and may generate a transmission. In an example, if the HARQ entity requests a retransmission and if UL HARQ operation is synchronous, the HARQ process may increment CURRENT_TX_NB by 1. In an example, if the HARQ entity requests a retransmission and if the HARQ entity requests an adaptive retransmission, the HARQ process may store the uplink grant received from the HARQ entity. The HARQ process may set CURRENT_IRV to the index corresponding to the redundancy version value provided in the HARQ information. In an example, if UL HARQ operation is synchronous the HARQ process may set HARQ_FEEDBACK to NACK and may generate a transmission. In an example, the HARQ entity may request a retransmission. The HARQ entity may request a non-adaptive retransmission and UL HARQ operation may be asynchronous or HARQ_FEEDBACK=NACK. The HARQ process may generate a transmission.

In an example, when receiving a HARQ ACK alone, the MAC entity may keep the data in the HARQ buffer. In an example, when no UL-SCH transmission can be made due to the occurrence of a measurement gap or a Sidelink Discovery Gap for Transmission, no HARQ feedback may be received and a non-adaptive retransmission may follow.

In an example, for asynchronous HARQ operation, UL retransmissions may be triggered by adaptive retransmission grants, except for retransmissions within a bundle. In an example, to generate a transmission, if the MAC PDU was obtained from the Msg3 buffer; or if Sidelink Discovery Gaps for Transmission are not configured by upper layers, and there is no measurement gap at the time of the transmission and, in case of retransmission, the retransmission does not collide with a transmission for a MAC PDU obtained from the Msg3 buffer in this TTI; or if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is no Sidelink Discovery Gap for Transmission in this TTI; or if Sidelink Discovery Gaps for Transmission are configured by upper layers, and there is no measurement gap at the time of the transmission and, in case of retransmission, the retransmission does not collide with a transmission for a MAC PDU obtained from the Msg3 buffer, and there is a Sidelink Discovery Gap for Transmission, and there is no configured grant for transmission on SL-DCH in this TTI, the HARQ process may instruct the physical layer to generate a transmission according to the stored uplink grant with the redundancy version corresponding to the CURRENT_IRV value; increment CURRENT_IRV by 1; and if UL HARQ operation is synchronous and there is a measurement gap or Sidelink Discovery Gap for Reception at the time of the HARQ feedback reception for this transmission and if the MAC PDU was not obtained from the Msg3 buffer, the HARQ process may set HARQ_FEEDBACK to ACK at the time of the HARQ feedback reception for this transmission.

In an example, after performing above actions, if UL HARQ operation is synchronous and if CURRENT_TX_NB=maximum number of transmissions—1, the HARQ process then may flush the HARQ buffer.

In an example, there may be one HARQ entity at the MAC entity for a Serving Cell with configured uplink, which may maintain a number of parallel HARQ processes allowing transmissions to take place continuously while waiting for the HARQ feedback on the successful or unsuccessful reception of previous transmissions. In an example, when the physical layer is configured for uplink spatial multiplexing, there may be two HARQ processes associated with a given TTI. Otherwise there may be one HARQ process associated with a given TTI.

In an example, at a given TTI, if an uplink grant is indicated for the TTI, the HARQ entity may identify the HARQ process(es) for which a transmission may take place. In an example, the HARQ entity may route the received HARQ feedback (ACK/NACK information), MCS and resource, relayed by the physical layer, to the appropriate HARQ process(es). In an example, in asynchronous HARQ operation, a HARQ process may be associated with a TTI based on the received UL grant except for UL grant in RAR. In an example, except for NB-IoT, an asynchronous HARQ process may be associated with a HARQ process identifier. For UL transmission with UL grant in RAR, HARQ process identifier 0 may be used. HARQ feedback may not be applicable for asynchronous UL HARQ.

In an example, when TTI bundling is configured, the parameter TTI_BUNDLE_SIZE may provide the number of TTIs of a TTI bundle. TTI bundling operation may rely on the HARQ entity for invoking the same HARQ process for a transmission that is part of the same bundle. Within a bundle HARQ retransmissions are non-adaptive and triggered without waiting for feedback from previous transmissions according to TTI_BUNDLE_SIZE. The HARQ feedback of a bundle may only be received for the last TTI of the bundle (e.g., the TTI corresponding to TTI_BUNDLE_SIZE), regardless of whether a transmission in that TTI takes place or not (e.g. when a measurement gap occurs). A retransmission of a TTI bundle may be a TTI bundle. TTI bundling may not be supported when the MAC entity is configured with one or more SCells with configured uplink.

In an example, uplink HARQ operation may be asynchronous for serving cells operating according to Frame Structure Type 3, NB-IoT UEs, BL UEs or UEs in enhanced coverage except for the repetitions within a bundle. In an example, for NB-IoT UEs, BL UEs or UEs in enhanced coverage, the parameter UL_REPETITION_NUMBER may provide the number of transmission repetitions within a bundle. For a bundle, UL_REPETITION_NUMBER may be set to a value provided by lower layers. Bundling operation may rely on the HARQ entity for invoking the same HARQ process for a transmission that is part of the same bundle. Within a bundle HARQ retransmissions may be non-adaptive and may be triggered without waiting for feedback from previous transmissions according to UL_REPETITION_NUMBER. An uplink grant corresponding to a new transmission or a retransmission of the bundle may be received after the last repetition of the bundle. A retransmission of a bundle may be a bundle.

In an example, TTI bundling may not be supported for RN communication with the E-UTRAN in combination with an RN subframe configuration. In an example, for transmission of Msg3 during Random Access, TTI bundling may not apply. For NB-IoT UEs, BL UEs or UEs in enhanced coverage, uplink repetition bundling may be used for transmission of Msg3.

In an example, for a TTI, the HARQ entity may identify the HARQ process(es) associated with the TTI.

In an example, for an identified HARQ process, an uplink grant may be indicated for the process and the TTI. In an example, the received grant may not be addressed to a Temporary C-RNTI on PDCCH and the NDI provided in the associated HARQ information may be toggled compared to the value in the previous transmission of the HARQ process. In an example, the uplink grant may be on PDCCH for the C-RNTI and the HARQ buffer of the identified process may be empty. In an example, the uplink grant may be received in a Random Access Response. In an example, if there is a MAC PDU in the Msg3 buffer and the uplink grant was received in a Random Access Response, the wireless device may obtain the MAC PDU to transmit from the Msg3 buffer. In an example, if the MAC entity is configured with semiPersistSchedIntervalUL shorter than 10 subframes and if the uplink grant is a configured grant, and if the HARQ buffer of the identified HARQ process is not empty, and if HARQ_FEEDBACK of the identified HARQ process is NACK, the wireless device may instruct the identified HARQ process to generate a non-adaptive retransmission. Otherwise, the wireless device may obtain the MAC PDU to transmit from a Multiplexing and assembly entity, if any. In an example, if a MAC PDU to transmit has been obtained, the MAC PDU and the uplink grant and the HARQ information may be delivered to the identified HARQ process. The wireless device may instruct the identified HARQ process to trigger a new transmission.

In an example, if the MAC entity is configured with skipUplinkTxSPS and if the uplink grant received on PDCCH was addressed to the Semi-PersistentScheduling C-RNTI and if the HARQ buffer of the identified process is empty, the wireless device may ignore the uplink grant. Otherwise, the wireless device may deliver the uplink grant and the HARQ information (redundancy version) to the identified HARQ process. The wireless device may instruct the identified HARQ process to generate an adaptive retransmission. In an example, if the HARQ buffer of this HARQ process is not empty, the wireless device may instruct the identified HARQ process to generate a non-adaptive retransmission.

In an example, when determining if NDI has been toggled compared to the value in the previous transmission the MAC entity may ignore NDI received in all uplink grants on PDCCH for its Temporary C-RNTI.

Figure 18:
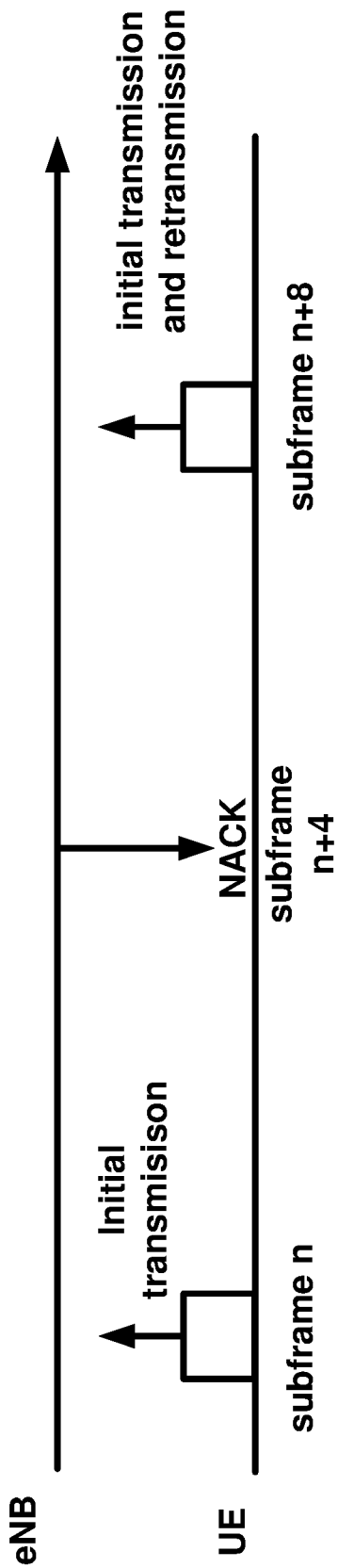
FIG. 18 is an example transmission and retransmission of transport blocks as per an aspect of an embodiment of the present disclosure.

In an example, an eNB may activate an SPS for a UE with short periodicity (e.g., with a periodicity less than 10 ms and/or 8 ms such as 1 ms, 2 ms, 4 ms, 8 ms, etc.). In an example, if the UE receives a NACK four subframes after a first transmission on a SPS resource, the UE may initiate a non-adaptive (e.g., without a grant from the eNB) retransmission at a later subframe (e.g., four subframes after the NACK or eight subframes after the first transmission), e.g., at the same resource blocks used for the first transmission. In an example, the UE may initiate the non-adaptive retransmission two times after the first transmission (e.g., on eight subframes and sixteen subframes after the first transmission) for example after receiving first and second NACKs respectively. In an example, the UE may initiate the non-adaptive retransmission three times after the first transmission (e.g., on eight subframes, sixteen subframes and twenty-four subframes after the first transmission) for example after receiving first, second and third NACKs. In an example, an adaptive retransmission may use the same resource blocks used for the first transmission. In an example, the subframe/resource that the UE uses for a non-adaptive retransmission may collide with a SPS resource (See for example FIG. 18). In an example, with SPS periodicity of 1 ms, a non-adaptive retransmission after a first transmission on a SPS resource may collide with a SPS resource.

Figure 19:
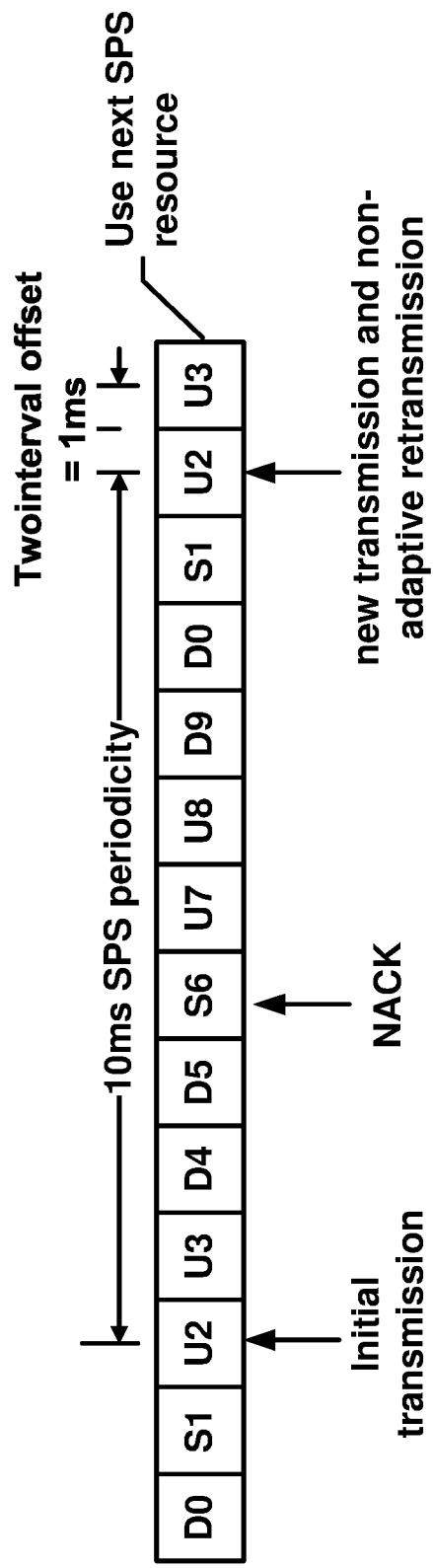
FIG. 19 is an example transmission and retransmission of transport blocks as per an aspect of an embodiment of the present disclosure.

In an example, the uplink HARQ RTT may be 10 ms in case of TDD configuration 1. In an example, if the uplink SPS period is 10 ms, a new transmission may coincide with a non-adaptive retransmission (See for example FIG. 19). In an example, a Two Intervals Config mechanism may be used to adjust an SPS period by a predefined sub-frame offset (See for example FIG. 19).

In an example, with short SPS period (e.g., with a periodicity less than 10 ms and/or 8 ms such as 1 ms, 2 ms, 4 ms, 8 ms, etc.), a non-adaptive retransmission and a new transmission may coincide in a same subframe/TTI. In an example, non-adaptive retransmission may be prioritized over new transmission on SPS resources. In an example, RRC configuration may be used to configure a UE to prioritize non-adaptive retransmission over new transmission.

In an example, the eNB may schedule retransmission by sending to the UE on PDCCH one or more adaptive retransmission grant. The UE may use the grant for adaptive retransmission and avoid conflict between a non-adaptive retransmission and new transmission on a SPS resource.

In an example, in response to the UE not having new UL data available for transmission on a SPS resource, the UE may initiate non-adaptive retransmissions on SPS resources based on ACK/NACK on PHICH. In an example, in response to the UE having new UL data available for transmission on a SPS resource, the UE may initiate and may prioritize non-adaptive retransmissions on SPS resources if NACK is received. In case of ACK, the UE may transmit new data on the SPS resource. In an example, the eNB may not know when the UE did the initial transmission when skip-padding is configured. In an example, non-adaptive retransmissions may use redundancy version 0 (RV0).

In an example, allowing non-adaptive retransmissions may not prevent scheduling adaptive retransmissions. Adaptive retransmissions may be for example useful to increase the redundancy version. In an example, adaptive retransmissions may be prioritized over non-adaptive retransmissions. In an example, if initial transmissions are skipped and the HARQ buffer is still empty, a new data may be transmitted when the adaptive retransmission is scheduled. In an example, adaptive retransmissions may be prioritized over non-adaptive retransmissions.

In an example embodiment, a UE may be configured with a plurality SPS configurations. In an example, a UE may be configured with a first and/or a second and/or a third SPS C-RNTI. In an example, other SPS C-RNTIs may be configured for the UE. In an example, a first subset of one or more SPS configurations may correspond to a first SPS C-RNTI. The subset of a set may include one or more elements of the set or no element. A first SPS C-RNTI may be a legacy (e.g., release 13, e.g., for VoIP, etc.) SPS C-RNTI. In an example, a second subset of the one or more SPS configurations may correspond to a second SPS C-RNTI. The second SPS C-RNTI may be e.g. a V2X UL SPS C-RNTI. In an example, a third subset of the one or more SPS configurations may correspond to a third SPS C-RNTI. The third SPS C-RNTI may be e.g. a SL SPS C-RNTI. In an example, the configured SPS configurations may have different parameters such as periodicity, offset (e.g., with respect to a reference subframe such as sbframe0 of SFN0), associated traffic logical channel ID and/or priority, etc. In an example, a fourth subset of the plurality of SPS configurations may be configured with short SPS periodicity (e.g., semiPersistSchedIntervalUL and/or other SPS interval indicator shorter than 10 ms and/or 8 ms). In an example, the fourth subset may comprise one or element from the first subset and/or one or more element from the second subset and/or one or more element from the third subset.

In an example, a SPS configuration of the plurality of SPS configurations configured for a UE may be configured/identified with one or more SPS indicator (e.g., an SPS index). In an example, an eNB may configure a plurality of SPS configurations (e.g., using one or more RRC messages). In an example, the eNB may indicate the indexes for one or more SPS configurations of the plurality of SPS configurations in the one or more RRC messages. In an example, an eNB may activate a SPS configuration using a DCI (e.g., DCI format 0). In an example, one or more fields of the DCI may have predetermined values that may be used by the UE to validate the DCI as an SPS activation DCI. In an example, the DCI activating a configured SPS may comprise the SPS index associated with the SPS configuration (e.g., if configured).

In an example, the plurality of SPS configurations configured for a UE may comprise one or more SPS configurations configured with skipping uplink SPS transmission (e.g., with skipUplinkTxSPS and/or other information element) when no data is available (e.g., for the logical channel priority class corresponding to the one or more SPS configuration) for transmission. In an example, if a SPS configuration configured with skipUplinkTxSPS is activated for the UE and if the UE has no data for transmission on a configured SPS grant of the SPS configuration, the UE may skip transmission on the corresponding subframe.

In an example, the eNB may activate two or more SPS configurations for the UE on a cell. In an example, the two or more activated SPS configurations may comprise of one or more SPS configuration with short periodicity (e.g., semiPersistSchedIntervalUL and/or other SPS interval indicator shorter than 10 ms and/or 8 ms).

In legacy LTE systems, a wireless device is configured with a single SPS configuration. The wireless device may be configured with a plurality of SPS configurations, for example, to enable new services such as V2X services. A UE configured with two or more SPS configurations may have two or more scheduled transmissions/retransmissions for a subframe. The two or more scheduled transmissions/retransmissions may correspond to two or more SPS configurations. In an example, at least one of the two or more scheduled transmissions may be for re-transmission of one or more SPS transport block (e.g. non-adaptive retransmission of one or more SPS TBs) of a SPS configuration in the two or more SPS configurations. A UE with multiple scheduled transmissions/retransmissions in a subframe may have one transmission at the subframe due to hardware constraints. The transmission of the two or more scheduled transmission/retransmission in a subframe leads to inefficient wireless device operation increasing the probability of error and degrading the detection probability for example at the base station. Example embodiments enhance the SPS mechanism to improve the efficiency of SPS transmissions/ retransmission when a UE has multiple scheduled SPS transmission/retransmission in a subframe.

Figure 20:
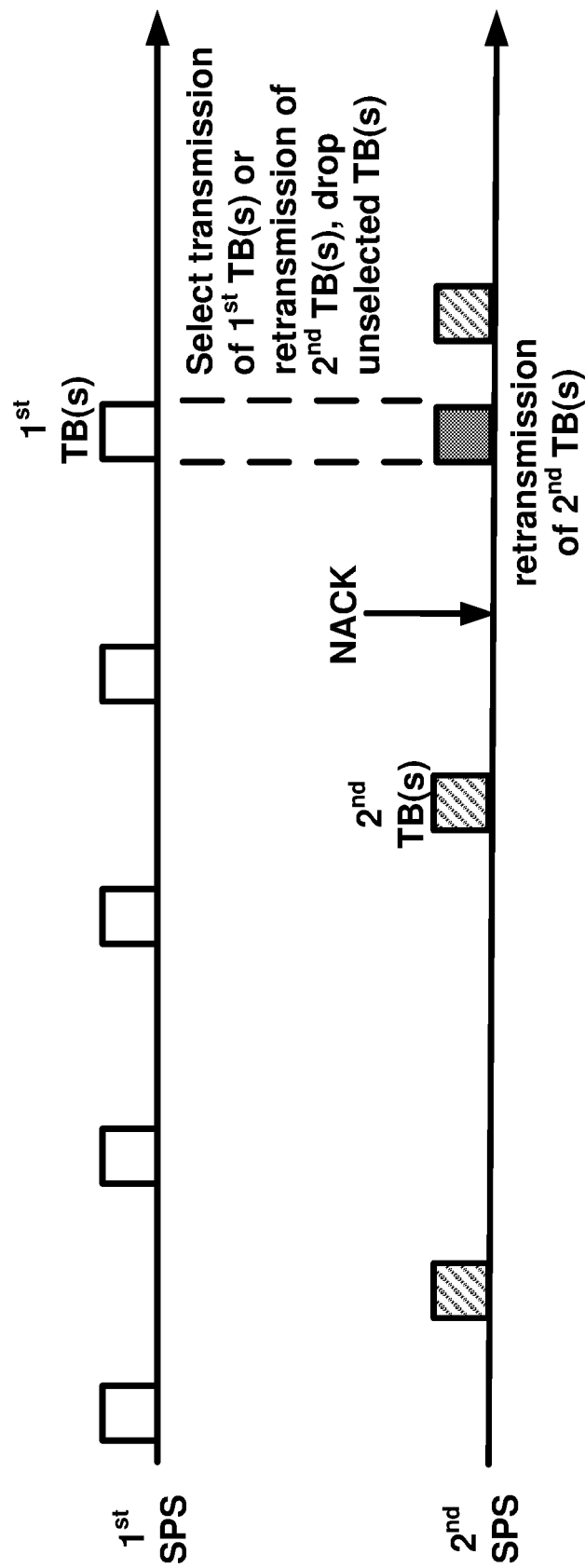
FIG. 20 is an example selection of transmission or retransmission of transport blocks as per an aspect of an embodiment of the present disclosure.

In an example embodiment, a wireless device may receive configuration parameters for a plurality of semi-persistent scheduling configurations. The wireless device may receive a first DCI activating a first plurality of SPS grants. The wireless device may receive a second SPS activating a second plurality of SPS grant. In an example, as shown in FIG. 20, the wireless device may receive one or more NACKs (e.g., via one or more PHICHs) in response to transmitting one or more second TBs employing a SPS grant in the second plurality of SPS grants. In an example, the one or more NACKs may implicitly indicate retransmission of at least one of the one or more second TBs a fixed time (e.g., four subframes) in response to receiving the one or more NACKs. In an example, the timing of the retransmission of the at least one or more second TBs may be in a same first TTI as timing of one of the first plurality of SPS grants for transmission of one or more first TBs. In an example, the wireless device may retransmit at least one of the one or more second TBs, after the initial transmission, for a plurality of times for example in response to receiving a plurality of NACKs. In an example, the wireless device may retransmit at least one of the one or more second TBs, eight subframe and/or sixteen subframes and/or twenty-four subframes after initial transmission of the one or more second TBs. In an example, in response to transmission of the one or more first TBs and the retransmission of the at least one of the one or more second TBs being scheduled in a same first TTI, the wireless device may select the transmission of the one or more first TBs or the retransmission of the at least one of the one or more second TBs based on one or more criteria. The wireless device may ignore/drop one or more unselected TBs. In an example, a UE may prioritize and/or select one scheduled transmission/retransmission and drop the other scheduled transmission/retransmission in a subframe.

In an example, one or more of the configured SPS grants for a subframe may correspond to SPS configuration(s) with short periodicity (e.g., semiPersistSchedIntervalUL and/or other SPS interval indicator shorter than 10 ms and/or 8 ms). In an example, at least one of the one or more configured SPS grants that correspond to short SPS periodicity may have a retransmission (e.g., adaptive and/or non-adaptive) on its corresponding SPS resource.

In an example embodiment, a method may be used comprising receiving one or more RRC messages comprising configuration parameters for a plurality of semi-persistent scheduling (SPS) configurations. The method may comprise receiving a first downlink control information (DCI) activating a first SPS. The method may comprise receiving a second DCI activating a second SPS. The method may comprise selecting one of a first SPS grant of the first SPS or a second SPS grant of the second SPS based criteria, when a transmission or re-transmission of the first SPS or the second SPS occur/coincide in a first subframe. The method may comprise transmitting, one or more transport blocks, based on the selected SPS grant in the first subframe. In an example, the method may further comprise ignoring/skipping/aborting one of the first SPS grant or the second SPS grant that is not selected in the first subframe. In an example, the plurality of SPS configurations may comprise a plurality of SPS cell radio network identifier (SPS C-RNTIs) and the plurality of SPS C-RNTIs may comprise a first SPS C-RNTI and a second SPS C-RNTI. In an example, the first grant and the second grant may be one of the following: for a new transmission of SPS traffic, for a re-transmission of SPS traffic. In an example, the selection may be based on an SPS C-RNTI. In an example, the selection may be based on one or more SPS configuration parameters indicating an SPS configuration type (legacy or new configuration).

In an example embodiment, a method may be used comprising receiving one or more RRC messages comprising configuration parameters for a plurality of semi-persistent scheduling (SPS) configurations. The method may comprise receiving a first downlink control information (DCIs) activating a first SPS. The method may comprise receiving a second DCI activating a second SPS. The method may comprise selecting one of a first SPS grant of the first SPS or a second SPS grant of the second SPS based criteria, when a transmission or re-transmission of the first SPS or the second SPS occur in a first subframe. The method may comprise transmitting, one or more transport blocks, based on the selected SPS grant in the first subframe. In an example, the method may further comprise ignoring/skipping/aborting one of the first SPS grant or the second SPS grant that is not selected in the first subframe. In an example, the plurality of SPS configurations may comprise a plurality of SPS cell radio network identifier (SPS C-RNTIs) and the plurality of SPS C-RNTIs may comprise a first SPS C-RNTI and a second SPS C-RNTI. In an example, the first grant and the second grant may be one of the following: for a new transmission of SPS traffic, for a re-transmission of SPS traffic. In an example, the selection may be based on one or more SPS configuration parameters indicating an SPS period. In an example, the selection may employ a second parameter when the first and second grant have the same periodicity. In an example, a first SPS configuration with periodicity shorter than ten subframes may be selected.

In an example embodiment, a method may be used comprising receiving one or more RRC messages comprising configuration parameters for a plurality of semi-persistent scheduling (SPS) configurations. The method may comprise receiving a first downlink control information (DCIs) activating a first SPS. The method may comprise receiving a second DCI activating a second SPS. The method may comprise selecting one of a first SPS grant of the first SPS or a second SPS grant of the second SPS based criteria, when a transmission or re-transmission of the first SPS or the second SPS occur in a first subframe. The method may comprise transmitting, one or more transport blocks, based on the selected SPS grant in the first subframe. In an example, the method may further comprise ignoring/skipping/aborting one of the first SPS grant or the second SPS grant that is not selected in the first subframe. In an example, the plurality of SPS configurations may comprise a plurality of SPS cell radio network identifier (SPS C-RNTIs) and the plurality of SPS C-RNTIs may comprise a first SPS C-RNTI and a second SPS C-RNTI. In an example, the first grant and the second grant may be one of the following: for a new transmission of SPS traffic, for a re-transmission of SPS traffic. In an example, the selection may be based on whether the first grant or the second grant is for a re-transmission or transmission.

In an example embodiment, a method may be used comprising receiving one or more RRC messages comprising configuration parameters for a plurality of semi-persistent scheduling (SPS) configurations. The method may comprise receiving a first downlink control information (DCIs) activating a first SPS. The method may comprise receiving a second DCI activating a second SPS. The method may comprise selecting one of a first SPS grant of the first SPS or a second SPS grant of the second SPS based criteria, when a transmission or re-transmission of the first SPS or the second SPS occur in a first subframe. The method may comprise transmitting, one or more transport blocks, based on the selected SPS grant in the first subframe. In an example, the method may further comprise ignoring/skipping/aborting one of the first SPS grant or the second SPS grant that is not selected in the first subframe. In an example, the plurality of SPS configurations may comprise a plurality of SPS cell radio network identifier (SPS C-RNTIs) and the plurality of SPS C-RNTIs may comprise a first SPS C-RNTI and a second SPS C-RNTI. In an example, the first grant and the second grant may be one of the following: for a new transmission of SPS traffic, for a re-transmission of SPS traffic. In an example, the selection may be based on a size of an SPS grant. In an example, the selection may be based on logical channel priorities corresponding to the at least a first grant.

Example embodiments may be combined to improve the efficiency of the SPS mechanism when the UE is configured with multiple SPS grants for a subframe.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 21:
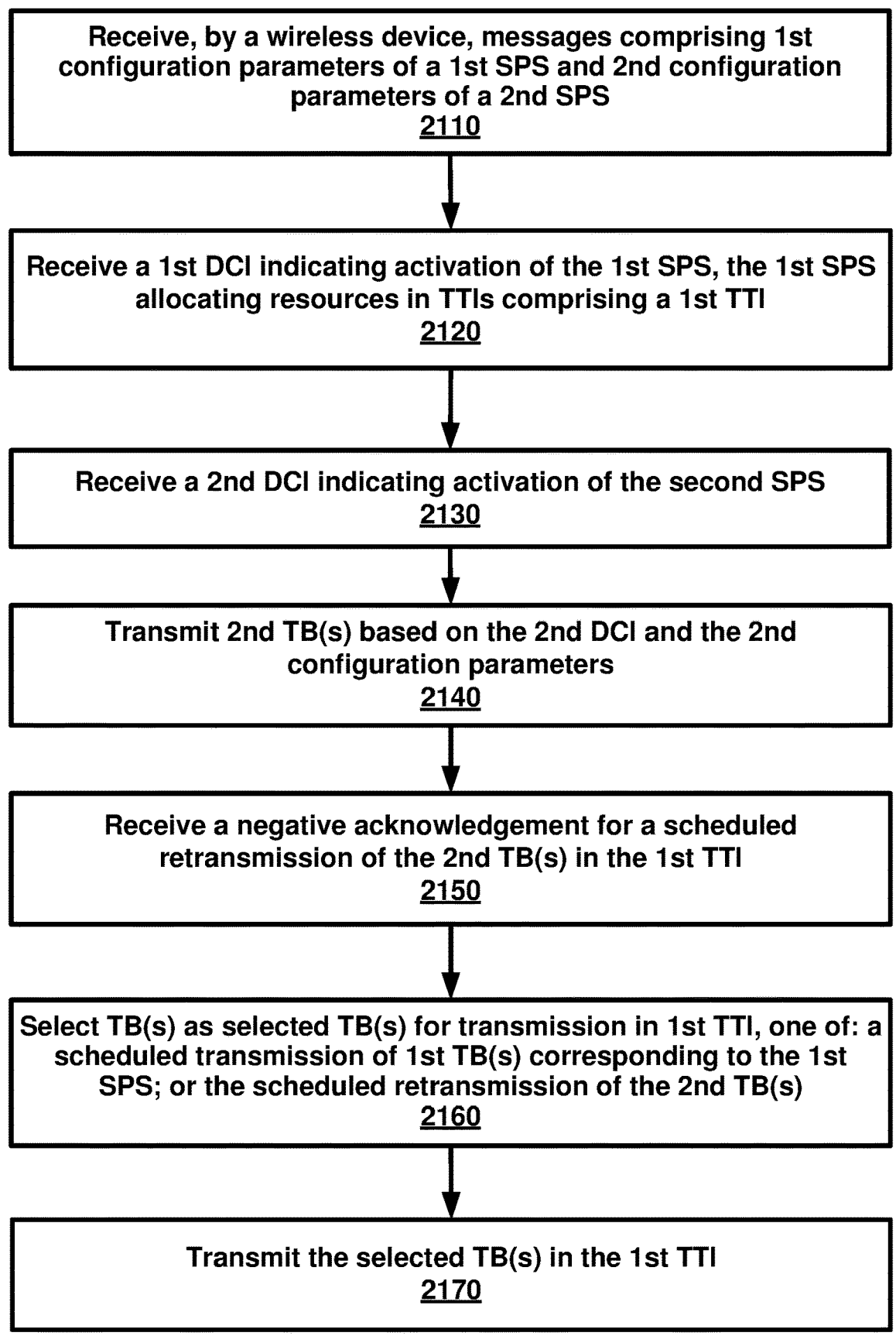
FIG. 21 is a flow diagram of an aspect of an embodiment of the present disclosure.

FIG. 21 is an example flow diagram as per an aspect of an embodiment of the present disclosure. At 2110, a wireless device may receive one or more messages. The message may comprise: first configuration parameters of a first semi-persistent scheduling (SPS) and second configuration parameters of a second SPS. At 2120, the wireless device may receive a first downlink control information (DCI) indicating activation of the first SPS. The first SPS may allocate resources in a plurality of transmission time intervals (TTIs) may comprise a first TTI. At 2130, the wireless device may receive a second DCI indicating activation of the second SPS. At 2140, the wireless device may transmit one or more second transport blocks (TBs) based on the second DCI and the second configuration parameters. At 2150, the wireless device may receive a negative acknowledgement for a scheduled retransmission of the one or more second TBs in the first TTI At 2160, the wireless device may select, as one or more selected TBs for transmission in the first TTI, one of: a scheduled transmission of one or more first TBs corresponding to the first SPS; or the scheduled retransmission of the one or more second TBs. At 2170, the wireless device may transmit the one or more selected TBs in the first TTI.

According to an embodiment, the wireless device may drop a scheduled transmission of unselected one or more TBs in the first TTI. According to an embodiment, one or more message may comprise a first SPS radio network temporary identifier (RNTI) and a second SPS RNTI.

According to an embodiment, the wireless device may select one or more TBs based on the first SPS RNTI and the second SPS RNTI. According to an embodiment, the first SPS may be associated with the first SPS RNTI and the second SPS may be associated with the second SPS RNTI.

According to an embodiment, the first SPS and the second SPS may be associated with the first SPS RNTI. According to an embodiment, the first SPS may be associated with a first SPS index and the second SPS may be associated with a second SPS index.

According to an embodiment, the first configuration parameters may comprise a first interval. The second configuration parameters may comprise a second interval. The selecting may be based on the first interval and the second interval.

According to an embodiment, the first DCI may indicate a first grant size. The second DCI may indicate a second grant size. The selecting may be based on the first grant size and the second grant size.

According to an embodiment, the one or more first TBs may comprise data from one or more first logical channels. The one or more second TBs may comprise data from one or more second logical channels. The selecting is based on the one or more first logical channels and the one or more second logical channels.

Figure 22:
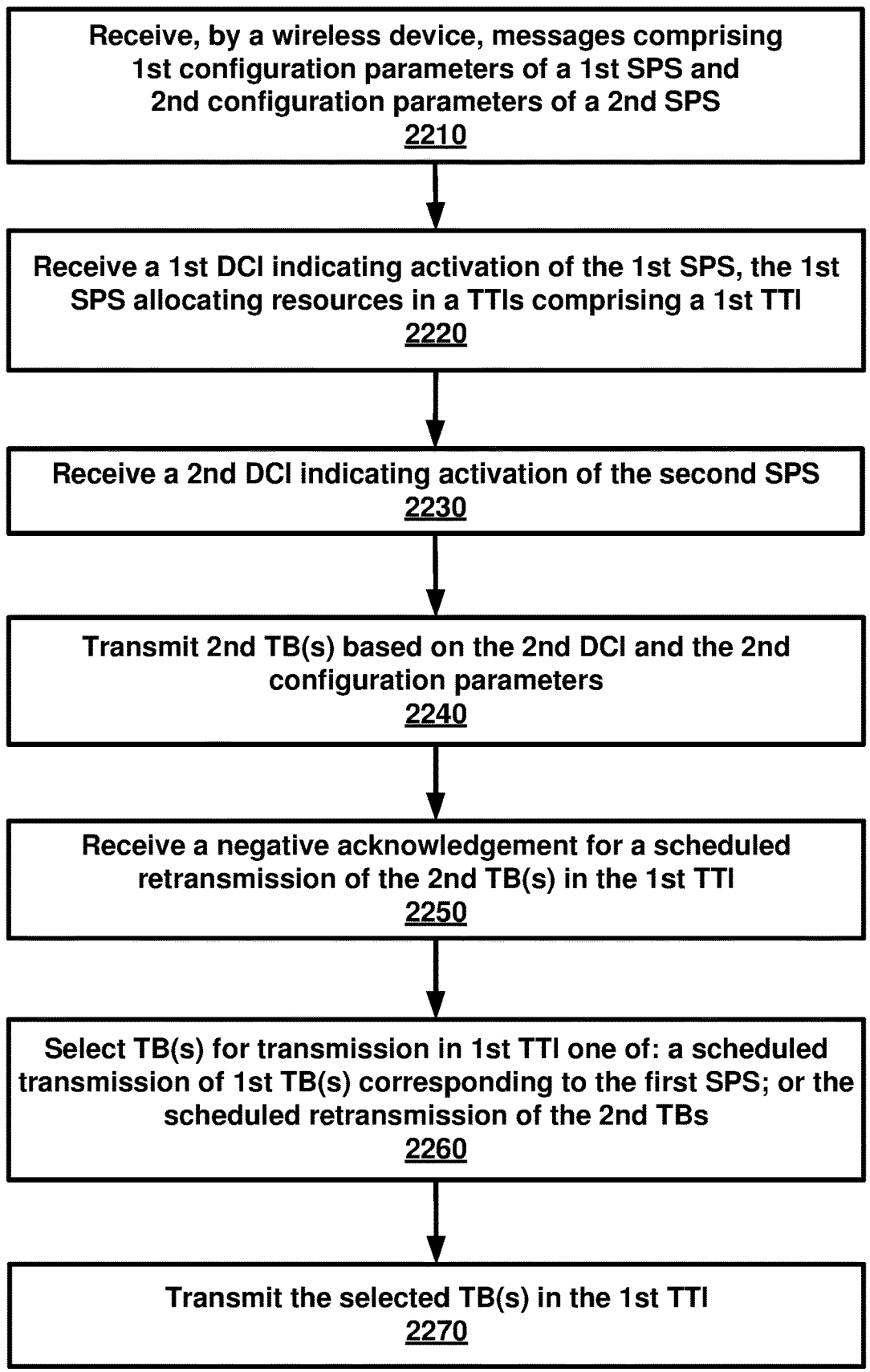
FIG. 22 is a flow diagram of an aspect of an embodiment of the present disclosure.

FIG. 22 is an example flow diagram as per an aspect of an embodiment of the present disclosure. At 2210, a wireless device may receive one or more messages. The message may comprise: first configuration parameters of a first semi-persistent scheduling (SPS) and second configuration parameters of a second SPS. At 2220, the wireless device may receive a first downlink control information (DCI) indicating activation of the first SPS. The first SPS may allocate resources in a plurality of transmission time intervals (TTIs) may comprise a first TTI. At 2230, the wireless device may receive a second DCI indicating activation of the second SPS. At 2240, the wireless device may transmit one or more second transport blocks (TBs) based on the second DCI and the second configuration parameters. At 2250, the wireless device may receive a negative acknowledgement for a scheduled retransmission of the one or more second TBs in the first TTI. At 2260, the wireless device may select, as one or more selected TBs for transmission in the first TTI, one of: a scheduled transmission of one or more first TBs corresponding to the first SPS; or the scheduled retransmission of the one or more second TBs. At 2270, the wireless device may transmit the one or more selected TBs in the first TTI.

According to an embodiment, the wireless device may drop a scheduled transmission of unselected one or more TBs in the first TTI. According to an embodiment, one or more message may comprise a first SPS radio network temporary identifier (RNTI) and a second SPS RNTI.

According to an embodiment, the wireless device may select one or more TBs based on the first SPS RNTI and the second SPS RNTI. According to an embodiment, the first SPS may be associated with the first SPS RNTI and the second SPS may be associated with the second SPS RNTI.

According to an embodiment, the first SPS and the second SPS may be associated with the first SPS RNTI. According to an embodiment, the first SPS may be associated with a first SPS index and the second SPS may be associated with a second SPS index.

According to an embodiment, the first configuration parameters may comprise a first interval. The second configuration parameters may comprise a second interval. The selecting may be based on the first interval and the second interval.

According to an embodiment, the first DCI may indicate a first grant size. The second DCI may indicate a second grant size. The selecting may be based on the first grant size and the second grant size.

According to an embodiment, the one or more first TBs may comprise data from one or more first logical channels. The one or more second TBs may comprise data from one or more second logical channels. The selecting is based on the one or more first logical channels and the one or more second logical channels.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on mission critical services such as mission critical push-to-talk services employing media types such as audio services, video services and media services. However, one skilled in the art will recognize that embodiments of the invention may also be implemented in a system comprising other types of services such as, for example, data services, augmented reality services, data fusion services, combinations thereof, and/or the like.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:
1. A method comprising:
receiving, by a wireless device, one or more radio resource messages comprising:

first configuration parameters of a first periodic resource allocation of a cell, wherein the first periodic resource allocation is associated with a first periodic resource allocation index; and second configuration parameters of a second periodic resource allocation of the cell, wherein the second periodic resource allocation is associated with a second periodic resource allocation index, and wherein the first periodic resource allocation and the second periodic resource allocation are associated with a first periodic resource allocation radio network temporary identifier (RNTI);

receiving a first downlink control information (DCI) indicating activation of the first periodic resource allocation, wherein the first periodic resource allocation comprises a plurality of transmission time intervals (TTIs) comprising a first TTI;

receiving a second DCI indicating activation of the second periodic resource allocation;

transmitting one or more second transport blocks (TBs) based on the second DCI and the second configuration parameters;

receiving a negative acknowledgement indicating a scheduled retransmission, during a second TTI, of the one or more second TBs;

determining, based on the first TTI overlapping with the second TTI, a resource conflict between the scheduled retransmission of the one or more second TBs and a scheduled transmission of one or more first TBs corresponding to the first periodic resource allocation;

selecting, based on the determining, the one or more second TBs or the one or more first TBs; and transmitting one or more selected TBs.

2. The method of claim 1, further comprising dropping a scheduled transmission of one or more unselected TBs.

3. The method of claim 1, further comprising receiving a first periodic resource allocation RNTI and a second periodic resource allocation RNTI.

4. The method of claim 3, wherein the selecting is based on the first periodic resource allocation RNTI and the second periodic resource allocation RNTI.

5. The method of claim 3, wherein the first periodic resource allocation is associated with the first periodic resource allocation RNTI and the second periodic resource allocation is associated with the second periodic resource allocation RNTI.

6. The method of claim 1, wherein: the first configuration parameters comprise a first interval; the second configuration parameters comprise a second interval; and the selecting is based on the first interval and the second interval.

7. The method of claim 1, wherein: the first DCI indicates a first grant size;

the second DCI indicates a second grant size; and the selecting is based on the first grant size and the second grant size.

8. The method of claim 1, wherein: the one or more first TBs comprise data from one or more first logical channels; the one or more second TBs comprise data from one or more second logical channels; and the selecting is based on the one or more first logical channels and the one or more second logical channels.

9. A wireless device comprising: one or more processors; memory storing instructions that, when executed by the one or more processors, cause the wireless device to:

receive one or more radio resource messages comprising:

first configuration parameters of a first periodic resource allocation of a cell, wherein the first periodic resource allocation is associated with a first periodic resource allocation index; and second configuration parameters of a second periodic resource allocation of the cell, wherein the first periodic resource allocation is associated with a first periodic resource allocation index and the second periodic resource allocation is associated with a second periodic resource allocation index, and wherein the first periodic resource allocation and the second periodic resource allocation are associated with the first periodic resource allocation radio network temporary identifier (RNTI);

receive a first downlink control information (DCI) indicating activation of the first periodic resource allocation, wherein the first periodic resource allocation comprises a plurality of transmission time intervals (TTIs) comprising a first TTI;

receive a second DCI indicating activation of the second periodic resource allocation; transmit one or more second transport blocks (TBs) based on the second DCI and the second configuration parameters;

receive a negative acknowledgement indicating a scheduled retransmission, during a second TTI, of the one or more second TBs;

determine, based on the first TTI overlapping with the second TTI, a resource conflict between the scheduled retransmission of the one or more second TBs and a scheduled transmission of one or more first TBs corresponding to the first periodic resource allocation;

select, based on the determining, the one or more second TBs or the one or more first TBs; and transmit one or more selected TBs.

10. The wireless device of claim 9, wherein the instructions when executed by the one or more processors, further cause the wireless device to drop a scheduled transmission of one or more unselected TBs.

11. The wireless device of claim 9, wherein the instructions when executed by the one or more processors, further cause the wireless device to receive a first periodic resource allocation RNTI and a second periodic resource allocation RNTI.

12. The wireless device of claim 11, wherein the selecting is based on the first periodic resource allocation RNTI and the second periodic resource allocation RNTI.

13. The wireless device of claim 11, wherein the first periodic resource allocation is associated with the first periodic resource allocation RNTI and the second periodic resource allocation is associated with the second periodic resource allocation RNTI.

14. The wireless device of claim 9, wherein: the first configuration parameters comprise a first interval; the second configuration parameters comprise a second interval; and the selecting is based on the first interval and the second interval.

15. The wireless device of claim 9, wherein: the first DCI indicates a first grant size;

the second DCI indicates a second grant size; and the selecting is based on the first grant size and the second grant size.

16. The wireless device of claim 9, wherein:

the one or more first TBs comprise data from one or more first logical channels; the one or more second TBs comprise data from one or more second logical channels; and the selecting is based on the one or more first logical channels and the one or more second logical channels.

* * * * *